United States Patent
Hunter

(10) Patent No.: US 9,417,160 B2
(45) Date of Patent: Aug. 16, 2016

(54) APPARATUS AND METHODS FOR EVALUATING SYSTEMS ASSOCIATED WITH WELLHEADS

(71) Applicant: S.P.M. Flow Control, Inc., Fort Worth, TX (US)

(72) Inventor: Scott Hunter, Arlington, TX (US)

(73) Assignee: S.P.M. FLOW CONTROL, INC., Fort Worth, TX (US)

( * ) Notice: Subject to any disclaimer, the term of this patent is extended or adjusted under 35 U.S.C. 154(b) by 548 days.

(21) Appl. No.: 13/900,669

(22) Filed: May 23, 2013

(65) Prior Publication Data

US 2013/0317750 A1 Nov. 28, 2013

Related U.S. Application Data

(60) Provisional application No. 61/651,819, filed on May 25, 2012.

(51) Int. Cl.
| | |
|---|---|
| *E21B 33/03* | (2006.01) |
| *G01M 99/00* | (2011.01) |
| *E21B 41/00* | (2006.01) |
| *G05B 23/02* | (2006.01) |

(52) U.S. Cl.
CPC ............... *G01M 99/00* (2013.01); *E21B 33/03* (2013.01); *E21B 41/00* (2013.01); *G05B 23/0283* (2013.01)

(58) Field of Classification Search
CPC ...................................... E21B 33/03
USPC ........................................... 702/6
See application file for complete search history.

(56) References Cited

U.S. PATENT DOCUMENTS

| | | | |
|---|---|---|---|
| 2,007,203 A | 7/1935 | Kraeft | |
| 2,191,782 A | 2/1940 | Valane | |

(Continued)

FOREIGN PATENT DOCUMENTS

| | | |
|---|---|---|
| AR | 84750 | 11/2012 |
| AU | 346763 | 2/2013 |

(Continued)

OTHER PUBLICATIONS

"International Preliminary Report on Patentability," dated Jul. 16, 2014, by the IPEA/US, re App No. PCT/US13/42345.

(Continued)

*Primary Examiner* — Bryan Bui
(74) *Attorney, Agent, or Firm* — Haynes and Boone, LLP

(57) ABSTRACT

According to one aspect, data identifying a component is received, wherein the component is part of a system associated with a wellhead. A location at which the component is positioned relative to one or more other components is identified. The useful remaining operational life of the component is predicted based on at least an operational parameter specific to the location, and the operational history of the component or one or more components equivalent thereto. According to another aspect, a model representing at least a portion of a proposed system associated with a wellhead is generated, the model comprising a plurality of objects, each of which has a proposed location and represents an existing component. The useful remaining operational life for each object is predicted based on an operational parameter at the corresponding proposed location, and data associated with the respective operational history of the existing component.

18 Claims, 10 Drawing Sheets

(56) References Cited

U.S. PATENT DOCUMENTS

| | | |
|---|---|---|
| 3,331,385 A | 7/1967 | Taylor |
| 3,465,572 A | 9/1969 | Thomas |
| 3,742,756 A | 7/1973 | Seager |
| 3,808,879 A | 5/1974 | Rogers |
| 4,044,833 A | 8/1977 | Volz |
| 4,329,925 A | 5/1982 | Hane et al. |
| 4,432,064 A | 2/1984 | Barker et al. |
| 4,574,880 A | 3/1986 | Handke |
| 4,866,607 A | 9/1989 | Anderson et al. |
| 4,916,641 A | 4/1990 | Bybee |
| 5,063,775 A | 11/1991 | Walker, Sr. et al. |
| 5,105,881 A | 4/1992 | Thoms et al. |
| D326,927 S | 6/1992 | Catalina |
| 5,269,180 A | 12/1993 | Dave et al. |
| 5,360,967 A | 11/1994 | Perkin et al. |
| 5,372,195 A | 12/1994 | Swanson et al. |
| 5,377,104 A | 12/1994 | Sorrells et al. |
| D354,677 S | 1/1995 | Troyer |
| D368,218 S | 3/1996 | Klein, III |
| 5,509,303 A | 4/1996 | Georgi |
| D371,370 S | 7/1996 | Fenton et al. |
| 5,722,490 A | 3/1998 | Ebinger |
| D406,590 S | 3/1999 | Heiligenstein et al. |
| D408,269 S | 4/1999 | Ross |
| D408,716 S | 4/1999 | Vesledahl |
| 6,123,394 A | 9/2000 | Jeffrey |
| 6,346,886 B1 | 2/2002 | De La Huerga |
| 6,457,529 B2 | 10/2002 | Calder et al. |
| 6,567,752 B2 | 5/2003 | Cusumano et al. |
| 6,592,822 B1 | 7/2003 | Chandler |
| 6,597,175 B1 | 7/2003 | Brisco |
| 6,648,606 B2 | 11/2003 | Sabini et al. |
| D492,670 S | 7/2004 | Hung et al. |
| D495,223 S | 8/2004 | Altman |
| 6,820,694 B2 | 11/2004 | Willberg et al. |
| 6,829,542 B1 | 12/2004 | Reynolds et al. |
| 6,831,571 B2 | 12/2004 | Bartel |
| 6,922,641 B2 | 7/2005 | Batzinger et al. |
| 6,989,764 B2 | 1/2006 | Thomeer et al. |
| 7,064,668 B2 | 6/2006 | Porad |
| 7,069,776 B2 | 7/2006 | Tudor |
| D527,378 S | 8/2006 | Raymond et al. |
| 7,083,391 B2 | 8/2006 | Sievert et al. |
| 7,096,718 B2 | 8/2006 | Matzner et al. |
| 7,096,961 B2 | 8/2006 | Clark et al. |
| 7,137,451 B2 | 11/2006 | Smith |
| D535,982 S | 1/2007 | Inoue |
| 7,159,654 B2 | 1/2007 | Ellison et al. |
| D538,630 S | 3/2007 | Sergi |
| 7,239,977 B2 | 7/2007 | Fantana et al. |
| 7,242,317 B2 | 7/2007 | Silvers |
| 7,259,675 B2 | 8/2007 | Baker et al. |
| D551,662 S | 9/2007 | Buren et al. |
| 7,267,798 B2 | 9/2007 | Chandler |
| 7,272,529 B2 | 9/2007 | Hogan et al. |
| 7,301,474 B2 | 11/2007 | Zimmerman |
| 7,308,331 B2 | 12/2007 | Bjornson |
| 7,383,882 B2 | 6/2008 | Lerche et al. |
| D573,589 S | 7/2008 | Montgomery et al. |
| 7,395,188 B1 | 7/2008 | Goebel et al. |
| 7,400,263 B2 | 7/2008 | Snider et al. |
| 7,412,898 B1 | 8/2008 | Smith et al. |
| D578,521 S | 10/2008 | Sergi et al. |
| 7,433,789 B1 | 10/2008 | Balestra |
| 7,477,160 B2 | 1/2009 | Lemenager et al. |
| 7,484,625 B2 | 2/2009 | Scott et al. |
| D597,086 S | 7/2009 | Sergi et al. |
| 7,557,716 B2 | 7/2009 | Morbitzer et al. |
| D598,274 S | 8/2009 | Nerskov |
| 7,579,950 B2 | 8/2009 | Lerch et al. |
| 7,603,296 B2 | 10/2009 | Whiteley et al. |
| 7,606,682 B2 | 10/2009 | Denny et al. |
| D603,383 S | 11/2009 | Nyalamadugu et al. |
| 7,619,523 B2 | 11/2009 | Durtschi et al. |
| D607,442 S | 1/2010 | Su et al. |
| 7,657,468 B1 | 2/2010 | Whiteley et al. |
| 7,664,685 B1 | 2/2010 | Whiteley et al. |
| 7,684,936 B2 | 3/2010 | Bechhoefer |
| D620,483 S | 7/2010 | Conrad et al. |
| 7,819,182 B2 | 10/2010 | Adamek |
| 7,823,640 B2 | 11/2010 | Flanders |
| 7,832,258 B2 | 11/2010 | Mudge et al. |
| 7,849,619 B2 | 12/2010 | Mosher, Jr. et al. |
| 7,893,832 B2 | 2/2011 | Laackmann |
| 7,912,678 B2 | 3/2011 | Denny et al. |
| 7,928,922 B2 | 4/2011 | King |
| D651,591 S | 1/2012 | Hunter et al. |
| D651,592 S | 1/2012 | Hunter et al. |
| D651,593 S | 1/2012 | Hunter et al. |
| 8,116,990 B2 | 2/2012 | Koul |
| D655,081 S | 3/2012 | Maravilla et al. |
| 8,485,448 B2 | 7/2013 | Maizlin et al. |
| D690,687 S | 10/2013 | Sun et al. |
| D713,825 S | 9/2014 | Witkowski et al. |
| 2001/0047283 A1 | 11/2001 | Melick et al. |
| 2002/0158120 A1 | 10/2002 | Zierolf |
| 2003/0139982 A1 | 7/2003 | Schwartz et al. |
| 2003/0192690 A1 | 10/2003 | Carlson et al. |
| 2003/0209133 A1 | 11/2003 | Greenfield et al. |
| 2004/0051368 A1 | 3/2004 | Caputo et al. |
| 2004/0052202 A1 | 3/2004 | Brollier |
| 2004/0074974 A1 | 4/2004 | Senba et al. |
| 2004/0078306 A1 | 4/2004 | Whiteley et al. |
| 2004/0088115 A1 | 5/2004 | Guggari et al. |
| 2004/0107823 A1 | 6/2004 | Kiley et al. |
| 2005/0087235 A1 | 4/2005 | Skorpik et al. |
| 2006/0022056 A1 | 2/2006 | Sakama et al. |
| 2006/0028344 A1 | 2/2006 | Forster |
| 2006/0043199 A1 | 3/2006 | Baba et al. |
| 2006/0076419 A1 | 4/2006 | Johnson |
| 2007/0018825 A1 | 1/2007 | Morbitzer et al. |
| 2007/0042820 A1 | 2/2007 | Cloonan |
| 2007/0124220 A1 | 5/2007 | Griggs et al. |
| 2007/0159336 A1 | 7/2007 | Tethrake et al. |
| 2007/0171075 A1 | 7/2007 | Ryu |
| 2007/0181726 A1 | 8/2007 | Ishikawa et al. |
| 2007/0226487 A1 | 9/2007 | Li |
| 2008/0009185 A1 | 1/2008 | Knoll et al. |
| 2008/0029541 A1 | 2/2008 | Wallace et al. |
| 2008/0252459 A1* | 10/2008 | Butler .................. G06K 7/0008 340/572.1 |
| 2009/0006153 A1 | 1/2009 | Greiner et al. |
| 2009/0058610 A1 | 3/2009 | Krebs et al. |
| 2009/0112308 A1 | 4/2009 | Kassem |
| 2009/0188675 A1 | 7/2009 | Bloom et al. |
| 2009/0205820 A1 | 8/2009 | Koederitz et al. |
| 2009/0208295 A1 | 8/2009 | Kinert et al. |
| 2009/0307763 A1 | 12/2009 | Rawlins et al. |
| 2010/0051286 A1 | 3/2010 | McStay |
| 2010/0096455 A1 | 4/2010 | Binmore |
| 2010/0123586 A1 | 5/2010 | Baba et al. |
| 2010/0326219 A1 | 12/2010 | Nelson et al. |
| 2011/0052423 A1 | 3/2011 | Gambier et al. |
| 2011/0060568 A1 | 3/2011 | Goldfine et al. |
| 2011/0139877 A1 | 6/2011 | Szakelyhidi et al. |
| 2011/0233283 A1 | 9/2011 | Hansen |
| 2011/0240747 A1 | 10/2011 | Stewart et al. |
| 2011/0270525 A1 | 11/2011 | Hunter |
| 2011/0273296 A1 | 11/2011 | Laase et al. |
| 2012/0061091 A1 | 3/2012 | Radi |

FOREIGN PATENT DOCUMENTS

| | | |
|---|---|---|
| AU | 346764 | 2/2013 |
| AU | 346765 | 2/2013 |
| AU | 346766 | 2/2013 |
| CA | 1333962 C | 1/1995 |
| CA | 2515233 C | 8/2005 |
| CA | 2486126 A1 | 10/2005 |
| CA | 2604118 C | 4/2008 |
| CA | 148446 | 8/2014 |
| CN | 1179196 A | 4/1998 |
| CN | 201035846 Y | 3/2008 |
| CN | 201142169 Y | 10/2008 |

(56) References Cited

FOREIGN PATENT DOCUMENTS

| | | |
|---|---|---|
| CN | 101320259 A | 12/2008 |
| CN | 1920901 B | 6/2011 |
| CN | 101038639 B | 6/2011 |
| CN | 101561676 B | 7/2011 |
| CN | 1862278 B | 9/2011 |
| CN | 102003167 B | 12/2011 |
| CN | 102312728 A | 1/2012 |
| CN | ZL201230542463 | 10/2013 |
| DE | 102009043267 A1 | 4/2011 |
| EM | 002132621-0001 | 11/2012 |
| EM | 002132621-0002 | 11/2012 |
| EP | 280489 B1 | 2/1994 |
| EP | 1895452 A1 | 3/2008 |
| EP | 2362061 | 8/2011 |
| FR | 2936039 A1 | 3/2010 |
| FR | 2955936 A1 | 8/2011 |
| GB | 2419671 A | 5/2006 |
| GB | 2475195 A | 5/2011 |
| JP | 11352243 | 12/1999 |
| JP | 2002352199 A | 12/2002 |
| JP | 2003035380 A | 2/2003 |
| JP | 2003139271 A | 5/2003 |
| JP | 2003185056 A | 7/2003 |
| JP | 2004213945 A | 7/2004 |
| JP | 2005181111 A | 7/2005 |
| JP | 2005335737 A | 12/2005 |
| JP | 2008033706 A | 2/2008 |
| JP | 2009083576 A | 4/2009 |
| JP | 2010152662 A | 7/2010 |
| JP | 4767148 B2 | 6/2011 |
| KR | 20050105674 A | 11/2005 |
| KR | 20060125151 A | 12/2006 |
| KR | 849955 B1 | 8/2008 |
| KR | 20100012277 A | 2/2010 |
| KR | 20120065631 A | 6/2012 |
| NO | 083874 | 3/2013 |
| PK | 16438-D | 5/2013 |
| SG | 146464 A1 | 10/2008 |
| SG | D2012/1277 F | 12/2012 |
| SG | D2012/1278 B | 12/2012 |
| TW | M305600 U | 2/2007 |
| TW | M305862 U | 2/2007 |
| WO | WO-2008012933 A1 | 1/2008 |
| WO | WO-2009089580 A1 | 7/2009 |
| WO | WO 2010018356 | 2/2010 |
| WO | WO-2010086596 A1 | 8/2010 |
| WO | WO-2011137460 A2 | 11/2011 |
| WO | WO-2012094503 A2 | 7/2012 |
| WO | WO-2012119048 A2 | 9/2012 |
| WO | WO-2013177353 A2 | 11/2013 |

OTHER PUBLICATIONS

International Search Report and Written Opinion for PCT/US2013/42345 by ISA/US dated Dec. 2, 2013.
"Azerbaijan office action dated Sep. 17, 2013, re App No. S20120046".
E&P, "New Wireless Solution Improves Visibility, Value, Safety," Terence Leung, 2010, p. 20.
International Search Report and Written Opinion, dated Nov. 23, 2011, re PCT/US2011/034863.
Kurita T., et al., "Network Wireless Sensor for Remote Monitoring of Gas Wells," Fuji Electric Review Journal, 2006, vol. 53 (1), pp. 17-20.
Mexico office action re App No. MX/F/2012/003572.
Notice of Allowance mailed Apr. 12, 2006, by the USPTO, re U.S. Appl. No. 10/755,456.
Notice of Allowance mailed Oct. 7, 2011, by the USPTO, re U.S. Appl. No. 29/393,452.
Notice of Allowance mailed Oct. 7, 2011, by the USPTO, re U.S. Appl. No. 29/393,453.
Notice of Allowance mailed Oct. 7, 2011, by the USPTO, re U.S. Appl. No. 29/393,454.
Office Action mailed Aug. 30, 2005, by the USPTO, re U.S. Appl. No. 10/755,456.
Office Action mailed Feb. 21, 2006, by the USPTO, re U.S. Appl. No. 10/755,456.
Office Action mailed Oct. 7, 2005, by the USPTO, re U.S. Appl. No. 10/755,456.
Office Action mailed Sep. 17, 2013, by the USPTO, re U.S. Appl. No. 13/099,307.
Pakistan office action re App No. 16438-D.
PC-102-Dome specification sheet, Available at http://troirfid.com and yahoo.sub.site.sub.admin/assets/docs/PC-102.sub/Dome.277173131.xls, last visited Jul. 12, 2011.
Petersen S., et al., "A Survey of Wireless Technology for the Oil and Gas Industry," Society of Petroleum Engineers, 2008 SPE Intelligent Energy Conference and Exhibition, Feb. 25-27, 2008, Amsterdam, The Netherlands.
Schempf, Hagen, Ph.D., "GasNet: Gas Main Sensor and Communications Network System, Phase 1 Topical Report," Document No. REP-GOV, DOE-020303, Work Performed by Automatika, Inc., Pittsburgh, PA15238, Feb. 27, 2003.
TROI-Home, http://www.troirfid.com, last visited Jul. 12, 2011.
Australia Exam Report, dated Oct. 24, 2014, re App No. 2011245111.
Chinese Office Action, dated Apr. 9, 2015, re App No. 201180032488.0.
Chinese Office Action, dated Aug. 8, 2014, re App No. 201180032488.0.
Eurasia Office Action, dated Apr. 13, 2015, re App No. 201291142.
Final Office Action, mailed Apr. 24, 2015, by the USPTO, re U.S. Appl. No. 13/099,307.
Mexico Office Action, dated Oct. 31, 2014, re App No. MX/a/2012/012444.
Supplemental European Search Report, mailed Apr. 8, 2015, re EP App No. 11775718.7.
Canadian Exam Report dated Jan. 13, 2014, by the CIPO, re App No. 148446.
Canadian Office Action, mailed Aug. 20, 2013, by the CIPO, re App No. 148446.
Mexico Office Action, mailed Sep. 19, 2013, re App No. MX/a/2012/012444.
Russian Office Action dated Oct. 21, 2013, re App No. 2012503905.
Australian Exam Report, by IP Australia, issued Jul. 26, 2013, re App No. 2011245111.
Canadian Exam Report, by the CIPO, dated May 2, 2014, re App No. 2797081.
Mexico Office Action, received Jun. 13, 2014, re App No. MX/a/2012/012444.
Notice of Allowance, mailed May 16, 2014, by the USPTO, re U.S. Appl. No. 29/420,448.
Office Action mailed Sep. 30, 2014, by the USPTO, re U.S. Appl. No. 13/099,307.
Supplementary European Search Report issued by the European Patent Office in related European Patent Application No. 13793301.6, dated Jun. 10, 2016, 8 pages.

* cited by examiner

APPARATUS AND METHODS FOR EVALUATING SYSTEMS ASSOCIATED WITH WELLHEADS

CROSS-REFERENCE TO RELATED APPLICATION

This application claims the benefit of the filing date of U.S. patent application No. 61/651,819, filed May 25, 2012, the entire disclosure of which is incorporated herein by reference.

TECHNICAL FIELD

This disclosure relates in general to systems associated with wellheads and, in particular, to improved apparatus and methods for evaluating existing or proposed systems associated with wellheads.

BACKGROUND OF THE DISCLOSURE

Several systems are used to facilitate oil and gas exploration and production operations. One example is a hydraulic fracturing (or "frac") system, which pumps fluid to a wellhead for the purpose of propagating factures in a formation through which a wellbore extends, the wellhead being the surface termination of the wellbore. In some cases, components of the hydraulic fracturing system unexpectedly need to be replaced, raising safety issues and increasing cost and downtime. In other cases, the overall configuration of a proposed system is deficient because one or more of the components that have been selected to be part of the system have relatively short useful remaining operational lives. These relatively short operational lives may be due, at least in part, to the operational parameters at the locations in the system where the components are expected to be positioned. Therefore, what is needed is an apparatus or method that addresses the foregoing issues, among others.

SUMMARY

In a first aspect, there is provided a method that includes receiving, using a computer, data identifying a first component in a first plurality of components, wherein the first plurality of components is part of a system associated with a wellhead, and wherein the first component has a useful remaining operational life; identifying, using the computer, a first location at which the first component is positioned relative to one or more other components in the first plurality of components; receiving, using the computer, data associated with a first operational parameter specific to the first location; receiving, using the computer, data associated with an operational history of the first component or one or more components equivalent thereto; and predicting, using the computer, the useful remaining operational life of the first component based on at least: the first operational parameter, and the operational history of the first component or one or more components equivalent thereto. Since the useful remaining operational life of the first component can be predicted, the method improves safety, reduces downtime and cost, and facilitates planning.

In an exemplary embodiment, the system associated with the wellhead is a system for pumping fluid to the wellhead.

In an exemplary embodiment, receiving the data identifying the first component includes receiving data associated with a first reading of a first identifier that is coupled to the first component.

In certain exemplary embodiments, receiving data associated with the first reading of the first identifier includes coupling the first identifier to the first component; positioning at least one reader in the vicinity of the first component; reading the first identifier using the at least one reader to thereby obtain the first reading; and transmitting the data associated with the first reading to the computer.

In another exemplary embodiment, the first identifier includes an RFID tag; and wherein the at least one reader is an RFID reader.

In certain embodiments, the first reading is part of a first plurality of readings to be taken in a first predetermined order, each place in the first predetermined order corresponding to a respective location of one component in the first plurality of components; and wherein identifying the first location at which the first component is positioned includes determining the place in the first predetermined order at which the first reading was made.

In yet another exemplary embodiment, the first operational parameter is selected from the group consisting of a fluid flow rate through the first component, a fluid pressure within the first component, a volume of media within the first component, a volume of proppant within the first component, a volume of sand within the first component, and a time period during which fluid is to be pumped through the first component.

In an exemplary embodiment, the first operational parameter specifies a value or range of values; and wherein receiving data associated with the operational history includes receiving data associated with measurements of one or more wear life attributes of the first component or one or more components equivalent thereto taken against time and under one or more operational parameters, the one or more operational parameters having the same, or different, values or ranges of values than that specified by the first operational parameter; and storing the data associated with the wear life attribute measurements and the one or more operational parameters made thereunder; and querying the stored data.

In another exemplary embodiment, predicting the useful remaining operational life of the first component includes determining a wear trend for the first component based on at least the first operational parameter and the data associated with the operational history of the first component or one or more components equivalent thereto; and predicting the useful remaining operational life of the first component using the wear trend.

In yet another exemplary embodiment, the method includes (a) receiving, using the computer, data identifying another component in the first plurality of components, wherein the another component has a useful remaining operational life; (b) identifying, using the computer, another location at which the another component is positioned relative to one or more other components in the first plurality of components; (c) receiving, using the computer, data associated with another operational parameter specific to the another location; (d) receiving, using the computer, data associated with an operational history of the another component or one or more components equivalent thereto; (e) predicting, using the computer, the useful remaining operational life of the another component based on at least: the another operational parameter, and the operational history of the another component or one or more components equivalent thereto; and (f) repeating (a)-(e) until the respective useful remaining operational lives of all the components in the first plurality of components have been predicted.

In an exemplary embodiment, the method includes receiving, using the computer, data identifying a second component in a second plurality of components, wherein the second plurality of components is part of the system associated with the wellhead, and wherein the second component has a useful remaining operational life; identifying, using the computer, a second location at which the second component is positioned relative to one or more other components in the second plurality of components; receiving, using the computer, data associated with a second operational parameter specific to the second location; receiving, using the computer, data associated with an operational history of the second component or one or more components equivalent thereto; and predicting, using the computer, the useful remaining operational life of the second component based on at least: the second operational parameter, and the operational history of the second component or one or more components equivalent thereto.

In a second aspect, an apparatus is provided that includes a non-transitory computer readable medium; and a plurality of instructions stored on the non-transitory computer readable medium and executable by a processor, the plurality of instructions including instructions that cause the processor to receive data identifying a first component in a first plurality of components, wherein the first plurality of components is part of a system associated with a wellhead, and wherein the first component has a useful remaining operational life; instructions that cause the processor to identify a first location at which the first component is positioned relative to one or more other components in the first plurality of components; instructions that cause the processor to receive data associated with a first operational parameter specific to the first location; instructions that cause the processor to receive data associated with an operational history of the first component or one or more components equivalent thereto; and instructions that cause the processor to predict the useful remaining operational life of the first component based on at least: the first operational parameter, and the operational history of the first component or one or more components equivalent thereto. Since the useful remaining operational life of the first component can be predicted, the apparatus improves safety, reduces downtime and cost, and facilitates planning.

In an exemplary embodiment, the system associated with the wellhead is a system for pumping fluid to the wellhead.

In certain embodiments, the apparatus includes a first identifier adapted to be coupled to the first component; and at least one reader adapted to read the first identifier and transmit the data identifying the first component.

In an exemplary embodiment, the first identifier is an RFID tag; and wherein the at least one reader is an RFID reader.

In another exemplary embodiment, the instructions that cause the processor to receive the data identifying the first component include instructions that cause the processor to receive data associated with a first reading of a first identifier that is coupled to the first component.

In yet another exemplary embodiment, the first reading is part of a first plurality of readings to be taken in a first predetermined order, each place in the first predetermined order corresponding to a respective location of one component in the first plurality of components; and wherein instructions that cause the processor to identify the first location at which the first component is positioned includes instructions that cause the processor to determine the place in the first predetermined order at which the first reading was made.

In certain exemplary embodiments, the first operational parameter is selected from the group consisting of a fluid flow rate through the first component, a fluid pressure within the first component, a volume of media within the first component, a volume of proppant within the first component, a volume of sand within the first component, and a time period during which fluid is to be pumped through the first component.

In another exemplary embodiment, the first operational parameter specifies a value or range of values; and wherein the operational history indicates a wear life of the first component or one or more components equivalent thereto as a function of time and the first operational parameter; and wherein instructions that cause the processor to receive data associated with the operational history includes instructions that cause the processor to receive data associated with measurements of one or more wear life attributes of the first component or one or more components equivalent thereto taken against time and under one or more operational parameters, the one or more operational parameters having the same, or different, values or ranges of values than that specified by the first operational parameter; and instructions that cause processor to store the data associated with the wear life attribute measurements and the one or more operational parameters made thereunder; and instructions that cause the processor to query the stored data.

In an exemplary embodiment, the instructions that cause the processor to predict the useful remaining operational life of the first component include instructions that cause the processor to determine a wear trend for the first component based on at least the first operational parameter and the data associated with the operational history of the first component or one or more components equivalent thereto; and instructions that cause the processor to predict the useful remaining operational life of the first component using the wear trend.

In another exemplary embodiment, the plurality of instructions further includes instructions that cause the processor to: (a) receive data identifying another component in the first plurality of components, wherein the another component has a useful remaining operational life; (b) identify another location at which the another component is positioned relative to one or more other components in the first plurality of components; (c) receive data associated with another operational parameter specific to the another location; (d) receive data associated with an operational history of the another component or one or more components equivalent thereto; (e) predict the useful remaining operational life of the another component based on at least: the another operational parameter, and the operational history of the another component or one or more components equivalent thereto; and (f) repeat (a)-(e) until the respective useful remaining operational lives of all the components in the first plurality of components have been predicted.

In yet another exemplary embodiment, the plurality of instructions further includes instructions that cause the processor to receive data identifying a second component in a second plurality of components, wherein the second plurality of components is part of the system associated with the wellhead, and wherein the second component has a useful remaining operational life; instructions that cause the processor to identify a second location at which the second component is positioned relative to one or more other components in the second plurality of components; instructions that cause the processor to receive data associated with a second operational parameter specific to the second location; instructions that cause the processor to receive data associated with an operational history of the second component or one or more components equivalent thereto; and instructions that cause the processor to predict the useful remaining operational life of the second component based on at least: the second operational parameter, and the operational history of the second component or one or more components equivalent thereto.

In a third aspect, there is provided a method that includes generating, using a computer, a model that represents at least a portion of a proposed system associated with a wellhead, the model including a plurality of objects, wherein each of the objects has a proposed location within the model, wherein each of the objects represents an existing component proposed to be part of the proposed system, and wherein each of the existing components has a useful remaining operational life; specifying, using the computer, at least one operational parameter at each of the respective proposed locations of the objects; receiving, using the computer, data associated with respective operational histories of the existing components; and predicting, using the computer, the useful remaining operational life for each object, wherein the prediction of the useful remaining operational life for each object is based on at least: the respective at least one operational parameter at the corresponding proposed location, and the data associated with the respective operational history of the existing component represented by the each object. Since the useful remaining operational life for each object can be predicted, the method improves safety, reduces downtime and cost, and facilitates planning.

In an exemplary embodiment, the proposed system associated with the wellhead is a proposed system for pumping fluid to the wellhead.

In an exemplary embodiment, the method includes rearranging the objects in the model and/or replacing one or more of the objects in the model with one or more other objects, wherein each of the other objects has a proposed location within the model, and wherein each of the other objects represents another existing component proposed to be part of the proposed system; and predicting, using the computer, the useful remaining operational life of each rearranged object and/or other object, wherein the prediction of the useful remaining operational life of the each rearranged object and/or other object is based on at least: the respective at least one operational parameter at the corresponding proposed location, and the data associated with the respective operational history of the existing component represented by the each rearranged object and/or other object.

In another exemplary embodiment, the method includes optimizing, using the computer, at least one of the objects in the model by maximizing the respective useful remaining operational life of the at least one object, including (a) moving, using the computer, the at least one object to another proposed location in the model; (b) after moving the at least one object to the another location in the model, predicting, using the computer, the useful remaining operational life of the at least one object, wherein the prediction of the useful remaining operational life of the at least one object is based on at least: the respective at least one operational parameter at the another proposed location, and the data associated with the respective operational history of the existing component represented by the at least one object; (c) repeating (a) and (b) until the another location at which the useful remaining operational life of the at least one object is at a maximum is determined; (d) if the at least one object is not at the another location at which the useful remaining operation life of the at least one object is at the maximum, then moving, using the computer, the at least one object to the another location at which the useful remaining operational life of the at least one object is at the maximum.

In yet another exemplary embodiment, the at least one operational parameter is selected from the group consisting of a proposed fluid flow rate, a proposed fluid pressure, a proposed volume of media, a proposed volume of proppant, a proposed volume of sand, and a proposed time period during which fluid is to be pumped.

In certain exemplary embodiments, each at least one operational parameter specifies a value or range of values; and wherein receiving data associated with each respective operational history includes receiving data associated with measurements of one or more wear life attributes of the corresponding existing component or one or more components equivalent thereto taken against time and under one or more operational parameters, the one or more operational parameters having the same, or different, values or ranges of values than that specified by the corresponding at least one operational parameter at the proposed location of the object that represents the corresponding existing component.

In other exemplary embodiments, predicting the useful remaining operational life for each object includes determining a wear trend for the corresponding existing component based on at least: the at least one operational parameter at the proposed location of the each object, and the data associated with the operational history of the existing component that is represented by the each object; and predicting the useful remaining operational life of the each object using the wear trend.

In a fourth aspect, there is provided an apparatus that includes a non-transitory computer readable medium; and a plurality of instructions stored on the non-transitory computer readable medium and executable by a processor, the plurality of instructions including instructions that cause the processor to generate a model that represents at least a portion of a proposed system associated with a wellhead, the model including a plurality of objects, wherein each of the objects has a proposed location within the model, wherein each of the objects represents an existing component proposed to be part of the proposed system, and wherein each of the existing components has a useful remaining operational life; instructions that cause the processor to specify at least one operational parameter at each of the respective proposed locations of the objects; instructions that cause the processor to receive data associated with respective operational histories of the existing components; and instructions that cause the processor to predict the useful remaining operational life for each object, wherein the prediction of the useful remaining operational life for each object is based on at least: the respective at least one operational parameter at the corresponding proposed location, and the data associated with the respective operational history of the existing component represented by the each object. Since the useful remaining operational life for each object can be predicted, the apparatus improves safety, reduces downtime and cost, and facilitates planning.

In an exemplary embodiment, the proposed system associated with the wellhead is a proposed system for pumping fluid to the wellhead.

In an exemplary embodiment, the plurality of instructions further includes: instructions that cause the processor to rearrange the objects in the model and/or replace one or more of the objects in the model with one or more other objects, wherein each of the other objects has a proposed location within the model, and wherein each of the other objects represents another existing component proposed to be part of the proposed system; and instructions that cause the processor to predict the useful remaining operational life of each rearranged object and/or other object, wherein the prediction of the useful remaining operational life of the each rearranged object and/or other object is based on at least: the respective at least one operational parameter at the corresponding proposed location, and the data associated with the respective operational history of the existing component represented by the each rearranged object and/or other object.

In another exemplary embodiment, the plurality of instructions further includes instructions that cause the processor to optimize at least one of the objects in the model by maximizing the respective useful remaining operational life of the at least one object, including instructions that cause the processor to: (a) move the at least one object to another proposed location in the model; (b) predict, after moving the at least one object to the another location in the model, the useful remaining operational life of the at least one object, wherein the prediction of the useful remaining operational life of the at least one object is based on at least: the respective at least one operational parameter at the another proposed location, and the data associated with the respective operational history of the existing component represented by the at least one object; (c) repeat (a) and (b) until the another location at which the useful remaining operational life of the at least one object is at a maximum is determined; (d) if the at least one object is not at the another location at which the useful remaining operation life of the at least one object is at the maximum, then move the at least one object to the another location at which the useful remaining operational life of the at least one object is at the maximum.

In yet another exemplary embodiment, the at least one operational parameter is selected from the group consisting of a proposed fluid flow rate, a proposed fluid pressure, a proposed volume of media, a proposed volume of proppant, a proposed volume of sand, and a proposed time period during which fluid is to be pumped.

In certain exemplary embodiments, each at least one operational parameter specifies a value or range of values; and wherein instructions that cause the processor to receive data associated with each respective operational history includes instructions that cause the processor to receive data associated with measurements of one or more wear life attributes of the corresponding existing component or one or more components equivalent thereto taken against time and under one or more operational parameters, the one or more operational parameters having the same, or different, values or ranges of values than that specified by the corresponding at least one operational parameter at the proposed location of the object that represents the corresponding existing component.

In other exemplary embodiments, the instructions that cause the processor to predict the useful remaining operational life for each object include instructions that cause the processor to determine a wear trend for the corresponding existing component based on at least: the at least one operational parameter at the proposed location of the each object, and the data associated with the operational history of the existing component that is represented by the each object; and instructions that cause the processor to predict the useful remaining operational life of the each object using the wear trend.

Other aspects, features, and advantages will become apparent from the following detailed description when taken in conjunction with the accompanying drawings, which are a part of this disclosure and which illustrate, by way of example, principles of the inventions disclosed.

DESCRIPTION OF FIGURES

The accompanying drawings facilitate an understanding of the various embodiments.

DETAILED DESCRIPTION

Figure 1A:
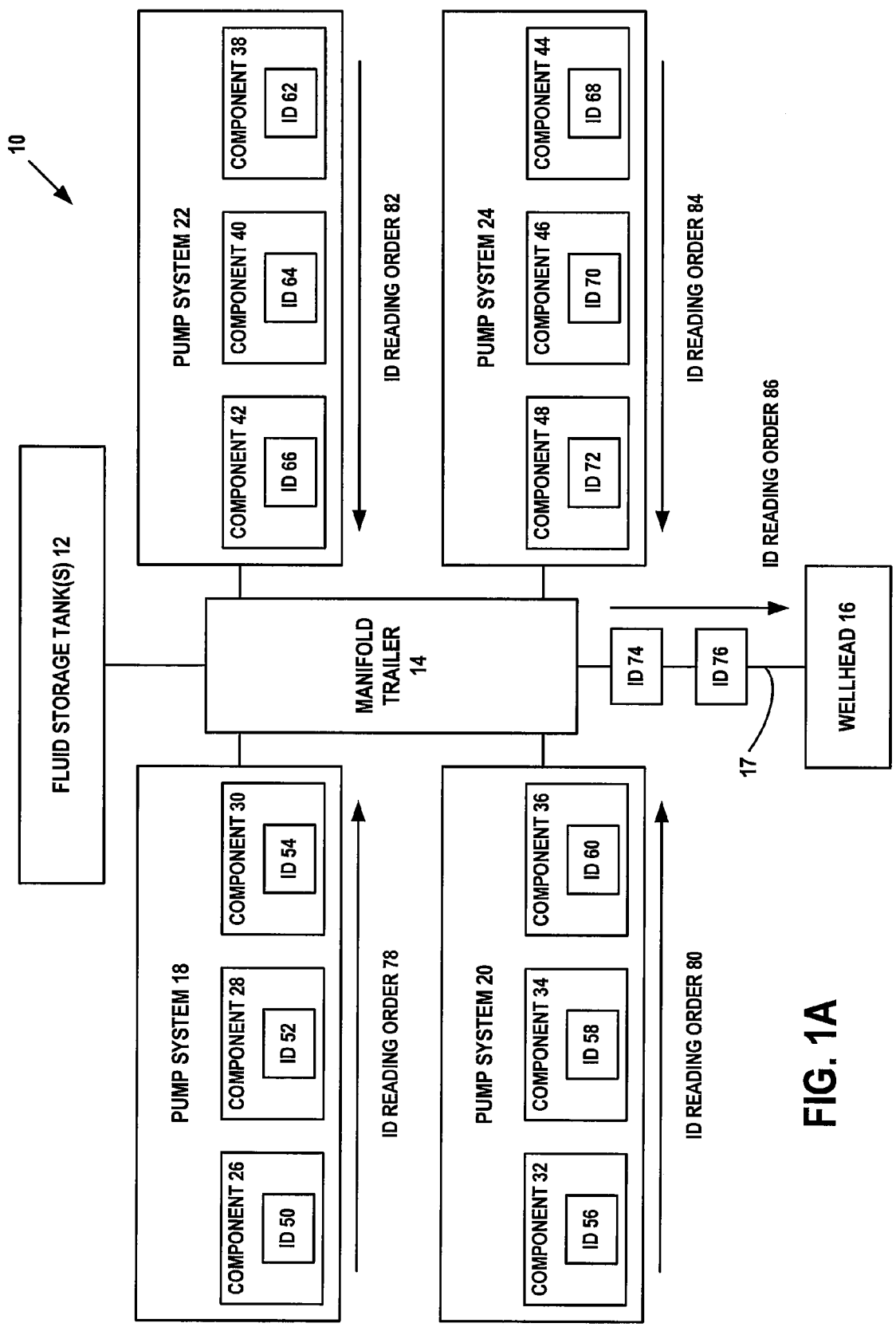
FIGS. 1A and 1B are diagrammatic illustrations of a system for pumping fluid to a wellhead according to an exemplary embodiment, the system including identifiers.
Figure 1B:
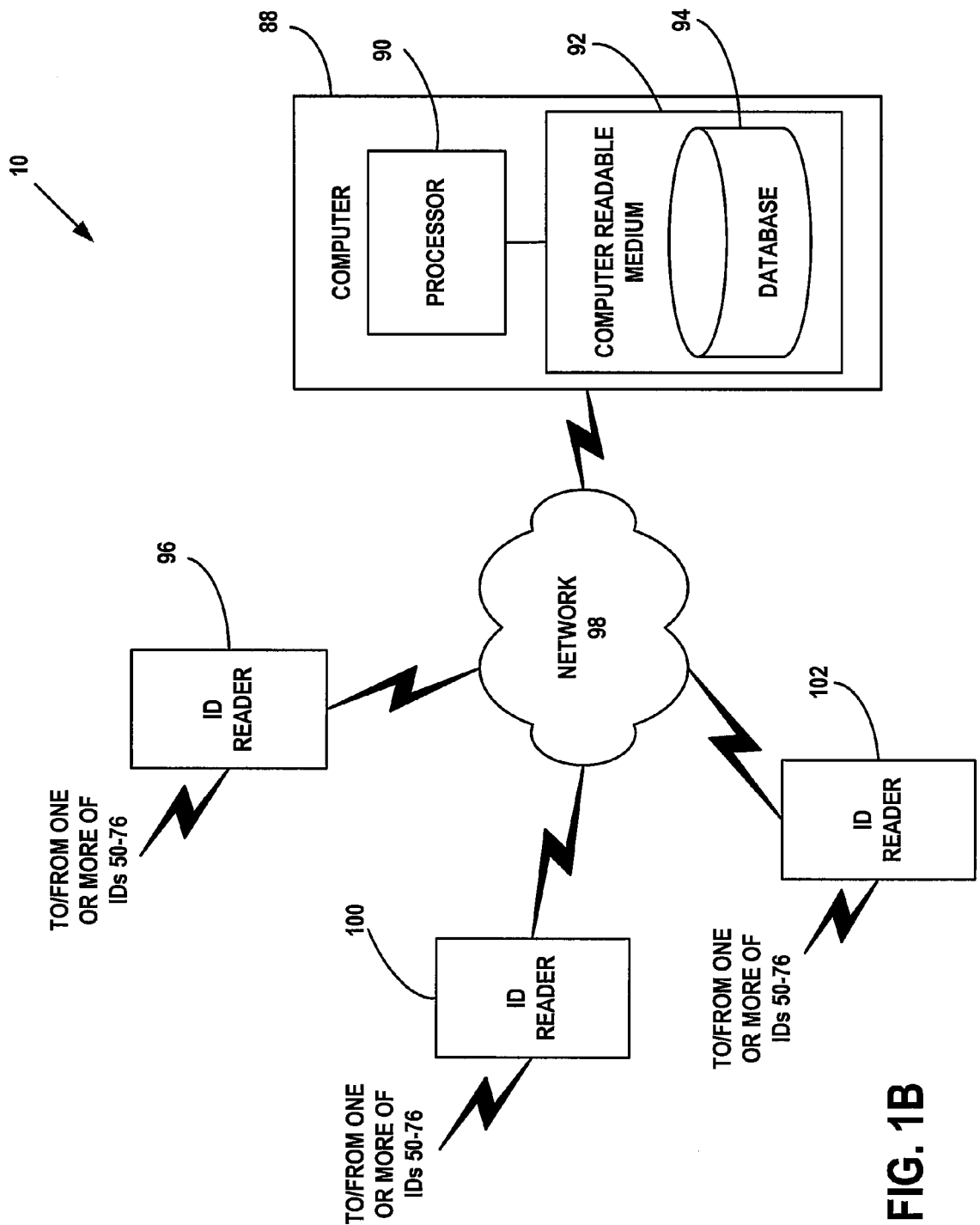

In an exemplary embodiment, as illustrated in FIGS. 1A and 1B, a system is generally referred to by the reference numeral 10 and includes one or more fluid storage tanks 12 for a fracturing system. The exemplary embodiments provided herein are not limited to a fracturing system as the embodiments may used or adapted to a mud pump system, well treatment system, or other pumping system.

A manifold trailer 14 is in fluid communication with the fluid storage tanks 12. A wellhead 16 is in fluid communication with the manifold trailer 14 via one or more fluid lines 17. The wellhead 16 is the surface termination of a wellbore (not shown). Pump systems 18, 20, 22 and 24 are in fluid communication with the manifold trailer 14. The pump system 18 includes components 26, 28 and 30. The pump system 20 includes components 32, 34 and 36. The pump system 22 includes components 38, 40 and 42. The pump system 24 includes components 44, 46 and 48.

In an exemplary embodiment, the system 10 is configured to pump fluid to the wellhead 16. More particularly, one or more of the pump systems 18, 20, 22 and 24 pump fluid from the fluid storage tanks 12 to the wellhead 16 via at least the manifold trailer 14 and the fluid lines 17. In an exemplary embodiment, the system 10 is, includes, or is part of, a hydraulic fracturing (or "frac") system. In an exemplary embodiment, the fluid storage tanks 12 are frac tanks. In an exemplary embodiment, each of the pump systems 18, 20, 22 and 24 is, includes, or is part of, a frac truck, a frac or well service pump, and/or any combination thereof. In an exemplary embodiment, each of the components 26, 28, 30, 32, 34, 36, 38, 40, 42, 44, 46 and 48 is a section of pipe, a fitting, a valve, a frac or well service pump component, a fluid line, a manifold, a fluid connection, and/or any combination thereof.

As shown in FIG. 1A, identifiers 50, 52 and 54 are coupled to the components 26, 28 and 30, respectively, of the pump system 18. Identifiers 56, 58 and 60 are coupled to the components 32, 34 and 36, respectively, of the pump system 20. Identifiers 62, 64 and 66 are coupled to the components 38, 40 and 42, respectively, of the pump system 22. Identifiers 68, 70 and 72 are coupled to the components 44, 46 and 48, respectively, of the pump system 24. Identifiers 74 and 76 are coupled to the fluid lines 17. As will be described in further detail below, the identifiers 50, 52 and 54 are arranged to be scanned or read in a predetermined reading order 78, the identifiers 56, 58 and 60 are arranged to be read in a predetermined reading order 80, the identifiers 62, 64 and 66 are arranged to be read in a predetermined reading order 82, the identifiers 68, 70 and 72 are arranged to be read in a predetermined reading order 84, and the identifiers 74 and 76 are arranged to be read in a predetermined reading order 86.

As shown in FIG. 1B, the system 10 further includes a computer 88, which includes a processor 90 and a computer readable medium 92 operably coupled thereto. Instructions accessible to, and executable by, the processor 90 are stored in the computer readable medium 92. A database 94 is also stored in the computer readable medium 92. An identification (ID) interrogator or reader 96 is operably coupled to, and in communication with, the computer 88 via a network 98. Likewise, ID readers 100 and 102 are each operably coupled to, and in communication with, the computer 88 via the network 98. Each of the ID readers 96, 100 and 102 is adapted to transmit signals to, and receive signals from, one or more of the identifiers 50-76.

In an exemplary embodiment, each of the identifiers 50-76 is a radio frequency identification (RFID) tag, and each of the ID readers 96, 100 and 102 is an RFID reader. In an exemplary embodiment, each of the identifiers 50-76 is a radio frequency identification (RFID) tag, and each of the ID readers 96, 100 and 102 is an MC9090-G Handheld RFID Reader, which is available from Motorola Solutions, Inc., Schaumburg, Ill.

In several exemplary embodiments, the computer 88 is a workstation, personal computer, server, portable computer, smartphone, personal digital assistant (PDA), cell phone, another type of computing device, and/or any combination thereof. In an exemplary embodiment, the computer 88 is part of one or more of the ID readers 96, 100 and 102. In an exemplary embodiment, the network 98 includes the Internet, one or more local area networks, one or more wide area networks, one or more cellular networks, one or more wireless networks, one or more voice networks, one or more data networks, one or more communication systems, and/or any combination thereof. In several exemplary embodiments, one or more of the components of the system 10 and/or content stored therein, and/or any combination thereof, are parts of, and/or are distributed throughout, the system 10 and/or one or more other components thereof. In several exemplary embodiments, the platforms of the system 10 are identical, different, or vary with respect to equipment, peripherals, hardware architecture and/or specifications, software architecture and/or specifications, and/or any combination thereof.

Figure 2:
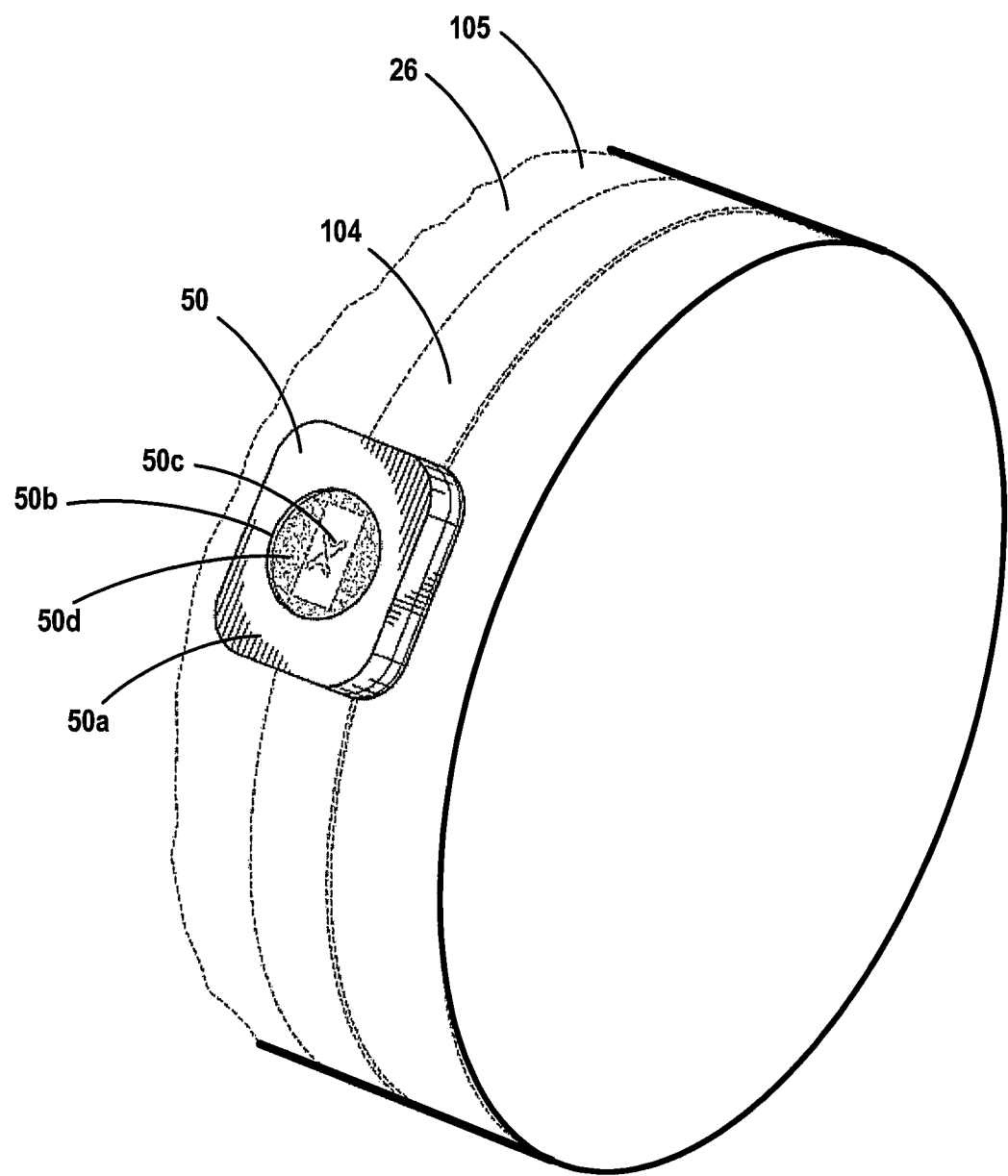
FIG. 2 is a perspective view of one of the identifiers illustrated in FIG. 1A, according to an exemplary embodiment.

In an exemplary embodiment, as illustrated in FIG. 2 with continuing reference to FIGS. 1A and 1B, the identifier 50 includes a plate 50*a* and a recess 50*b* formed therein. An RFID chip 50*c* is disposed in the recess 50*b*. An insert material 50*d* such as, for example, an elastomeric material, an epoxy, a potting compound or material, and/or any combination thereof, is disposed in the recess 50*b* and surrounds the RFID chip 50*c*. The component 26 is, or includes, a pipe 105 in the pump system 18. A band 104 is connected to the plate 50*a* of the identifier 50 by spot welding. The band 104 extends about the pipe 105, thereby coupling the identifier 50 to the component 26.

In an exemplary embodiment, each of the identifiers 52-76 is identical to the identifier 50 and therefore will not be described in further detail. In an exemplary embodiment, one or more of the identifiers 52-72 are coupled to the components 26-48, respectively, using respective bands that are similar to the band 104 and in a manner similar to the manner by which the identifier 50 is coupled to the pipe 105. In an exemplary embodiment, one or both of the identifiers 74 and 76 are coupled to the fluid lines 17 using respective bands that are similar to the band 104 and in a manner similar to the manner by which the identifier 50 is coupled to the pipe 105. In several exemplary embodiments, instead of, or in addition to the band 104 or a band similar thereto, one or more of the identifiers 50-72 are coupled to the components 26-48, respectively, using another type of fastener component, such as, but not limited to, an adhesive and/or a mechanical fastener such as, but not limited to, a disc or plate. In several exemplary embodiments, instead of, or in addition to the band 104 or a band similar thereto, one or both of the identifiers 74 and 76 are coupled to the fluid lines 17 using another type of fastener, such as an adhesive and/or a mechanical fastener.

Figure 3:
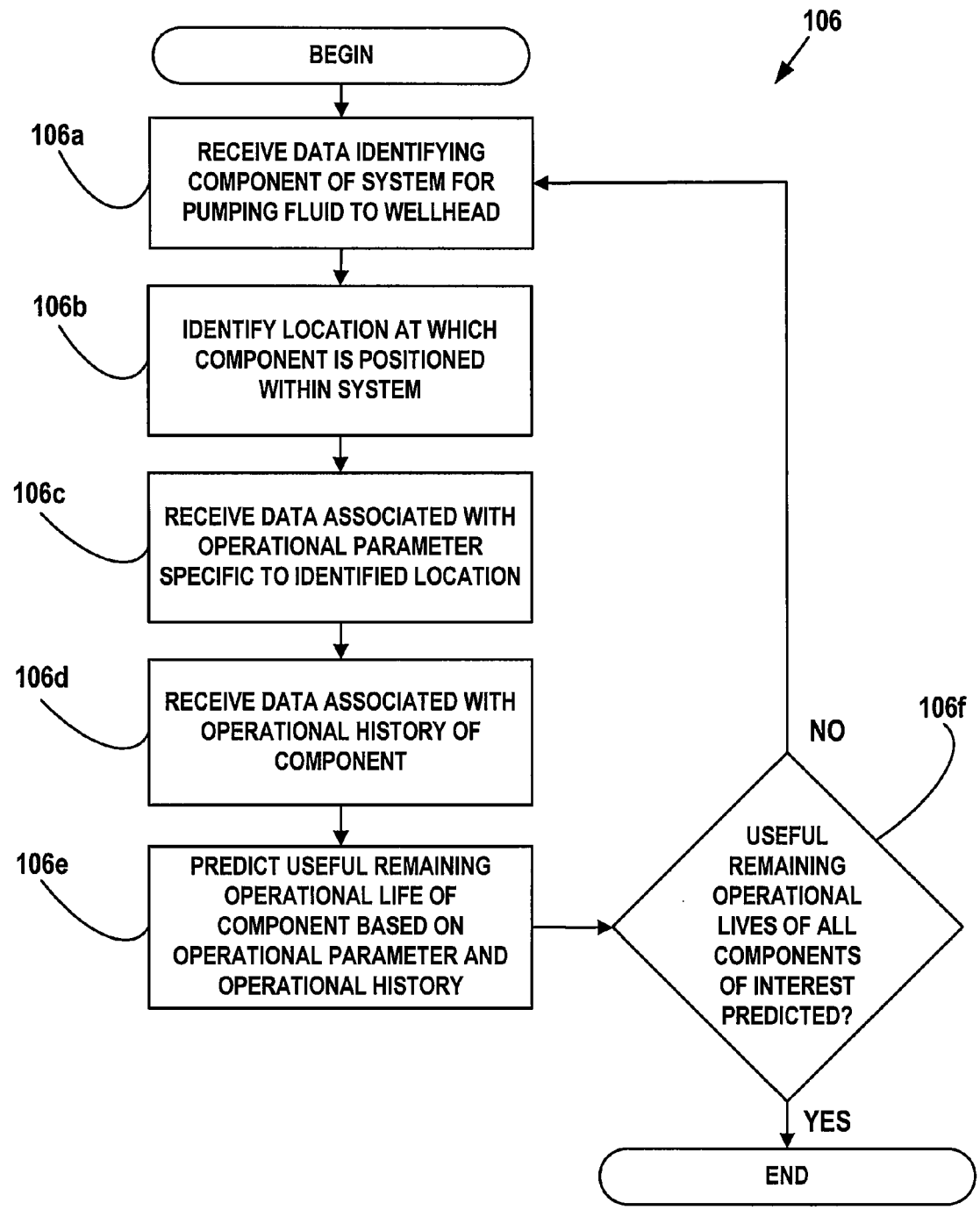
FIG. 3 is another perspective view of the identifier of FIG. 2, according to an exemplary embodiment.

In an exemplary embodiment, as illustrated in FIG. 3 with continuing reference to FIGS. 1A, 1B and 2, a method of operating the system 10 is generally referred to by the reference numeral 106. In several exemplary embodiments, the method 106 is implemented in whole or in part using the computer 88, one or more of the ID readers 96, 100 and 102, or any combination thereof. As an example, the method 106 will be described with respect to the component 26. However, the execution of the method 106 with respect to any of the components 28-48, or the fluid lines 17 of the system 10, is identical to the execution of the method 106 with respect to the component 26, but for replacing the component 26 with one of the components 28-48 or the fluid lines 17.

As shown in FIG. 3, the method 106 includes a step 106*a*, at which data identifying the component 26 is received. Before, during or after the step 106*a*, the location within the system 10 at which the component 26 is positioned is identified at step 106*b*. Before, during or after the step 106*b*, data associated with an operational parameter specific to the location identified at the step 106*b* is received at step 106*c*. Before, during or after the step 106*c*, data associated with the operational history of the component 26 is received at step 106*d*. At step 106*e*, the useful remaining operational life of the component **26* is predicted based on at least the operational parameter with which the data received at the step 106*c* is associated, as well as the operational history with which the data is received at the step 106*d*. At step 106*f*, it is determined whether all useful remaining operational lives of all components of interest have been predicted. That is, it is determined at the step 106*f* whether there is a component other than the component 26 for which the useful remaining operational life is desired to be predicted. If so, then the steps 106*a*, 106*b*, 106*c*, 106*d* and 106*e* are repeated for another of the components 28-48.

Figure 4:
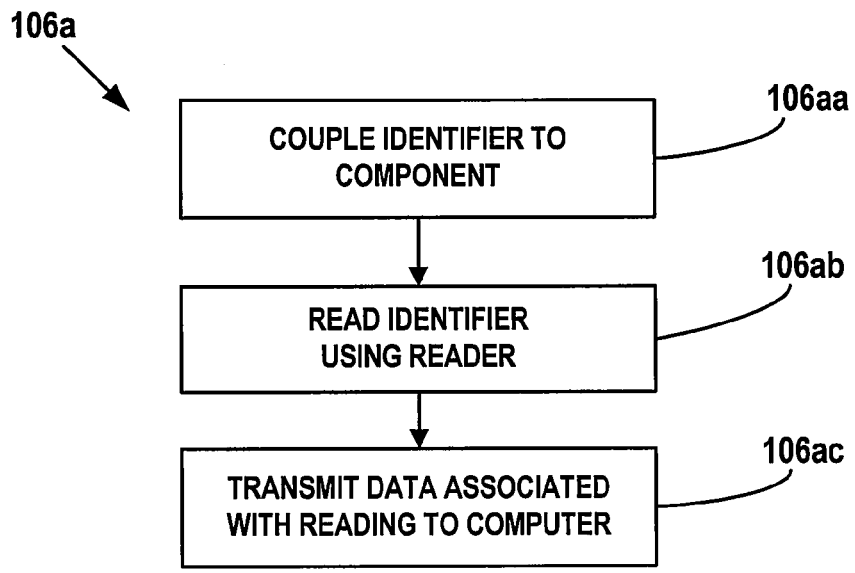
FIGS. 4, 5, 6 and 7 are flow chart illustrations of respective steps of the method of FIG. 3, according to respective exemplary embodiments.

In an exemplary embodiment, as illustrated in FIG. 4 with continuing reference to FIGS. 1A, 1B, 2 and 3, to receive the data identifying the component 26 at the step 106*a*, the identifier 50 is coupled to the component 26 at the step 106*aa*, in accordance with the foregoing. At step 106*ab*, the identifier 50 is read using one of the ID readers 96, 100 and 102. For example, at the step 106*ab*, the ID reader 96 sends at least one signal to the identifier 50 and then receives response signal(s) from the identifier 50, the response signal(s) including identification information such as, for example, a stock number or unique tag serial number. At step 106*ac*, data associated with the reading taken at the step 106*ab* is transmitted to the computer 88. In an exemplary embodiment, the data transmitted at the step 106*ac* is stored in the database 94.

Figure 5:
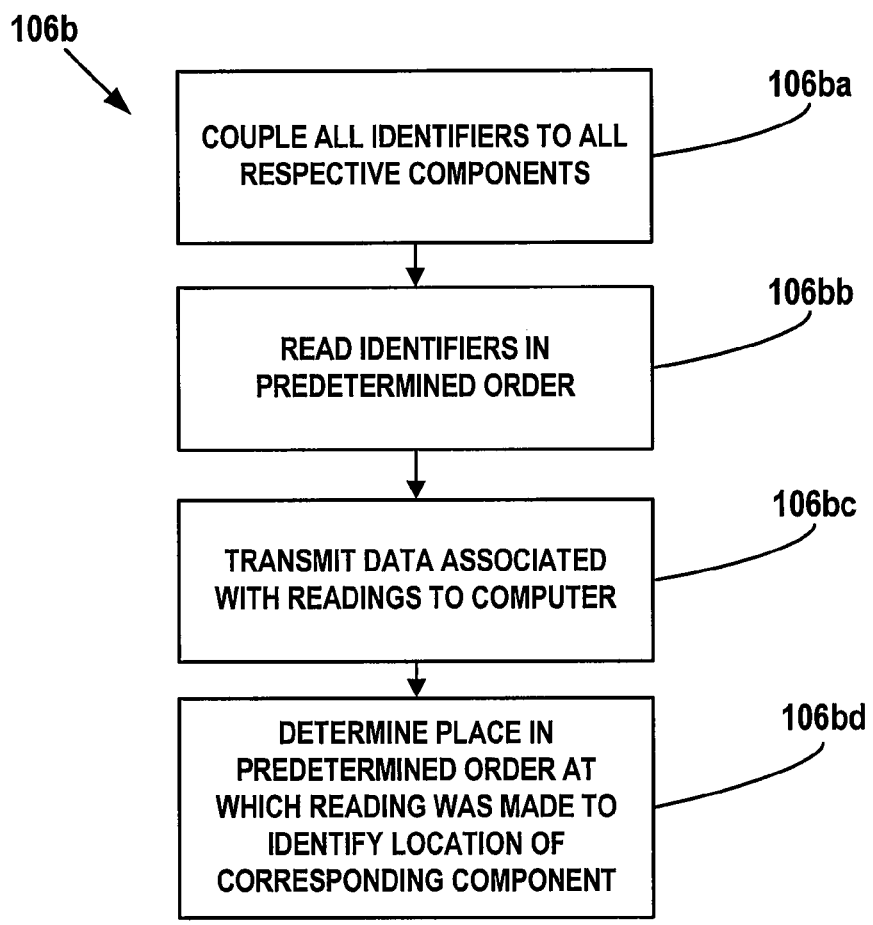

In an exemplary embodiment, as illustrated in FIG. 5 with continuing reference to FIGS. 1A, 1B, 2, 3 and 4, to identify the location at which the component 26 is positioned within the system 10 at the step 106*b*, at step 106*ba* the identifiers 50-72 are coupled to the components 26-48, respectively, and the identifiers 74 and 76 are coupled to the fluid lines 17. In an exemplary embodiment, the step 106*aa* is part of the step 106*ba*.

Before, during or after the step 106*ba*, the identifiers 50-76 are read in a predetermined order at step 106*bb*. In an exemplary embodiment, the step 106*ab* is part of the step 106*bb*.

In an exemplary embodiment, the predetermined order in which the identifiers 50-76 are read at the step 106*bb* begins with the predetermined reading order 78, followed by the predetermined reading orders 80, 82, 84 and 86. In an exemplary embodiment, the predetermined order in which the identifiers 50-76 are read at the step 106*bb* begins with one of the predetermined reading orders 78, 80, 82, 84 and 86, followed by a predetermined order of the remaining predetermined reading orders 78, 80, 82, 84 and 86. In an exemplary embodiment, at the step 106*bb*, only the identifiers 26-30 are read in the predetermined reading order 78 and thus the predetermined order is the predetermined order 78. In an exemplary embodiment, if the method 106 is executed with respect to another of the components 28-48, then only the identifiers 28-48 that are part of the corresponding pump system 18, 20, 22 and 24 are read in the corresponding predetermined reading order 78-84, which is the predetermined order at the step 106*bb*.

Before, during or after the step 106*bb*, data associated with the readings taken at the step 106*bb* are transmitted to the computer 88 at step 106*bc*. In an exemplary embodiment, the ID readers 96, 100 and 102 used to execute the step 106*ba* count the respective readings as they are taken in the predetermined order, and this counting data is transmitted along with the identification information data to the computer 88. In an exemplary embodiment, the data transmitted at the step 106*bc* is stored in the database 94.

Before, during or after the step 106*bc*, at step 106*bd* the place in the predetermined order at which the reading of the identifier 50 was made is identified, and the location of the component 26 is determined based on the place. In an exemplary embodiment, at the step 106*bd*, the processor 90 accesses the identification information and counting data transmitted at the step 106*bc* and stored in the database 94, and correlates the identification information data associated with the identifier 50, that is, the identity of the component 26, with the counting data to thereby determine the location of the component 26. In an exemplary embodiment, at the step 106*bd*, the respective ID reader 96, 100 or 102 used to read the identifier 50 correlates the identification information data associated with the identifier 50, that is, the identity of the component 26, with the counting data to thereby determine the location of the component 26. In an exemplary embodiment, at the step 106*bd*, a combination of the computer 88 and the respective ID reader 96, 100 or 102 used to read the identifier 50 correlates the identification information data associated with the identifier 50, that is, the identity of the component 26, with the counting data to thereby determine the location of the component 26.

In an exemplary embodiment, as noted above, before, during or after the step 106*b*, at the step 106*c* data associated with one or more operational parameters specific to the location identified at the step 106*b* is received by the computer 88. In an exemplary embodiment, the data is received at the step 106*c* as a result of a user entering the data into the computer 88. In an exemplary embodiment, the one or more operational parameters, with which the data received at the step 106*c* is associated, includes one or more of the following: a fluid flow rate through the component 26, a fluid pressure within the component 26, a volume of media within the component 26, a volume of proppant within the component 26, a volume of sand within the component 26, and a time period during which fluid is to be pumped through the component 26.

Figure 6:
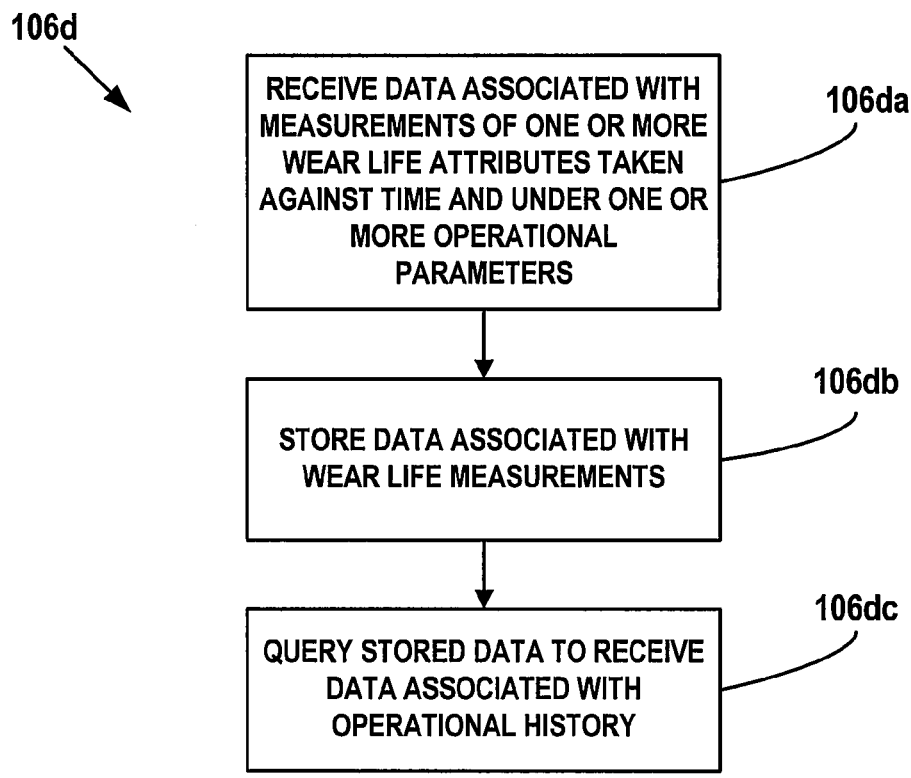

In an exemplary embodiment, as illustrated in FIG. 6 with continuing reference to FIGS. 1A, 1B, 2, 3, 4 and 5, to receive data associated with the operational history of the component 26 at the step 106*d*, at step 106*da* data associated with measurements of one or more wear life attributes taken against time and under one or more operational parameters is received by the computer 88. Before, during or after the step 106*da*, the data received at the step 106*da* is stored in the database 94 at step 106*db*. At step 106*dc*, the computer 88 queries the stored data to thereby receive the data associated with the operational history of the component 26.

In an exemplary embodiment, the data received at the step 106*da* is, or includes, measurements of wear life attributes, such as erosion measurements, pressure ratings or wall thickness measurements of the component 26 or one or more components equivalent thereto, over a period time and under one or more operational parameters such as, for example, a fluid pressure within the component 26, a fluid flow rate through the component 26, a volume of media within the component 26, a volume of proppant within the component 26, or a volume of sand within the component 26. In several exemplary embodiments, the data received at the step 106*da* may be obtained by taking physical measurements, or conducting testing, of the component 26, or one or more components equivalent thereto, over a period of time while noting the operational parameters under which the measurements or tests are being taken. In several exemplary embodiments, components that may be equivalent to the component 26 may be components that have functions, dimensions, material properties, surface finishes, etc. that are similar to that of the component 26.

Figure 7:
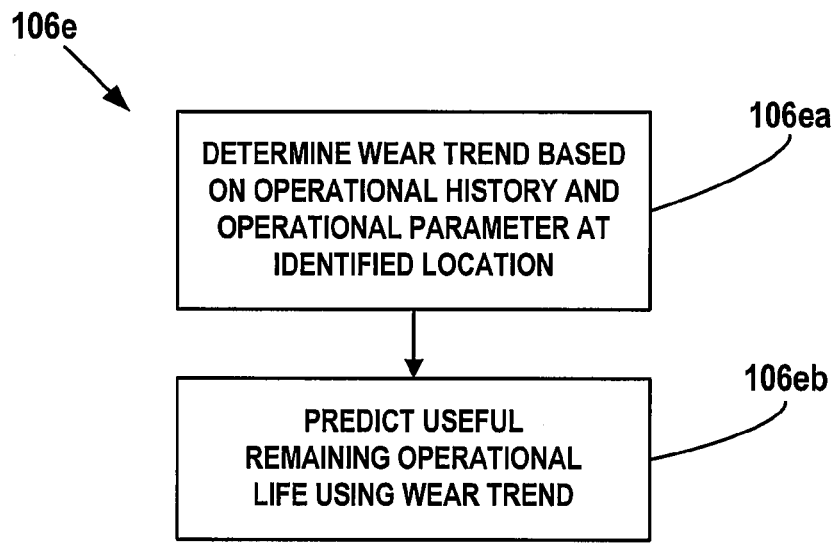

In an exemplary embodiment, as illustrated in FIG. 7 with continuing reference to FIGS. 1A, 1B, 2, 3, 4, 5 and 6, to predict the useful remaining operational life of the component 26 at the step 106*e*, a wear trend is determined at step 106*ea*, and the useful remaining operational life of the component 26 is predicted using the wear trend at step 106*eb*. At the step 106*ea*, the wear trend is determined based on at least the operational parameter and operational history with which the data received at steps 106*c* and 106*d*, respectively, are associated. For example, the data received at the step 106*da* may indicate that there is a 25% reduction in wall thickness in the component 26 over a certain period of time under a condition wherein a certain type of sand flows through the component 26, and/or under a certain pressure range. The wear trend determined at the step 106*ea* may be based on this 25% reduction, but may be adjusted due to a variation of the type of sand to flow through the component 26 at the location identified at the step 106*b*, and/or due to a variation of the pressure at the location identified at the step 106*b*. For another example, the data received at the step 106*da* may indicate a wear trendline (linear or otherwise, as a function of time) under certain operational parameter(s), and the wear trendline may be modified due to a variation of the type of sand to flow through the component 26 at the location identified at the step 106*b*, due to a variation of the pressure at the location identified at the step 106*b*, and/or due to another variation in operational parameter(s) at the location identified at the step 106*b*. More particularly, in one example, the rate of wear may be increased from that indicated by the data received at the step 106*da* when the pressure at the location identified at the step 106*b* is expected to be greater than the pressure under which the measurements that are associated with the data received at the step 106*da*, and/or when the type of material expected to flow at the location identified at the step 106b is more caustic than the type of material used during the measurements that are associated with the data received at the step 106da. In another example, the rate of wear may be decreased from that indicated by the data received at the step 106da when the pressure at the location identified at the step 106b is expected to be less than the pressure under which the measurements that are associated with the data received at the step 106da, and/or when the type of material expected to flow at the location identified at the step 106b is less caustic than the type of material used during the measurements that are associated with the data received at the step 106da.

In an exemplary embodiment, once the wear trend has been determined at the step 106ea, the useful remaining operational life of the component 26 is predicted at the step 106eb using the wear trend determined at the step 106ea. More particularly, the amount of time remaining under the operational parameters specific to the location identified at the step 106b, during which time the component 26 can operate while still meeting specifications, such as safety and/or performance specifications, is determined at the step 106eb using the wear trend determined at the step 106ea. This time calculation at the step 106eb indicates the amount of time left before the wear on the component 26 causes wear life attribute(s) of the component 26 to drop below minimum acceptable level(s) with respect to, for example, safety and/or performance. These wear life attribute(s) can include one or more dimensions, relationships or ratios between dimensions, degrees or percentages of erosion, degradations in pressure test results, variances in quality/inspection tests, etc.

As noted above, although the method 106 has been described above in connection with the component 26, the execution of the method 106 with respect to any of the components 28-48 of the system 10 is identical to the execution of the method 106 with respect to the component 26, but for replacing the component 26 with one of the components 28-48 or the fluid lines 17. If it is determined at the step 106f that the useful remaining operational lives of all components of interest have not been predicted, the steps 106a, 106b, 106c, 106d and 106e are repeated for one of the components 28-48 or the fluid lines 17.

In several exemplary embodiments, one or more of the steps 106a, 106b, 106c, 106d, 106e and 106f of the method 106 are implemented in whole or in part using the computer 88, one or more of the ID readers 96, 100 and 102, or any combination thereof.

As a result of the method 106, safety is improved because the useful remaining operational lives of different components of the system 10 are predicted, and plans may be made to replace those components having relatively short useful remaining operational lives. As a result of the method 106, components of the system 10 nearing or past minimum specifications may be identified and removed from service prior to failure. Moreover, as a result of the method 106, downtime due to component failure during the operation of the system 10 is reduced because the replacement of components having relatively short useful remaining operational lives can be planned before operating the system 10, rather than having to replace such components midway during the operation of the system 10. Additionally, execution of the method 106 provides the ability to plan well service item requirements and replacement costs, improves operational performance, and reduces operating costs. Also, execution of the method 106 may assist well service companies and operators with spending plans by predicting the amount of well site-related jobs different components of the system 10 will be able to complete.

Figure 8A:
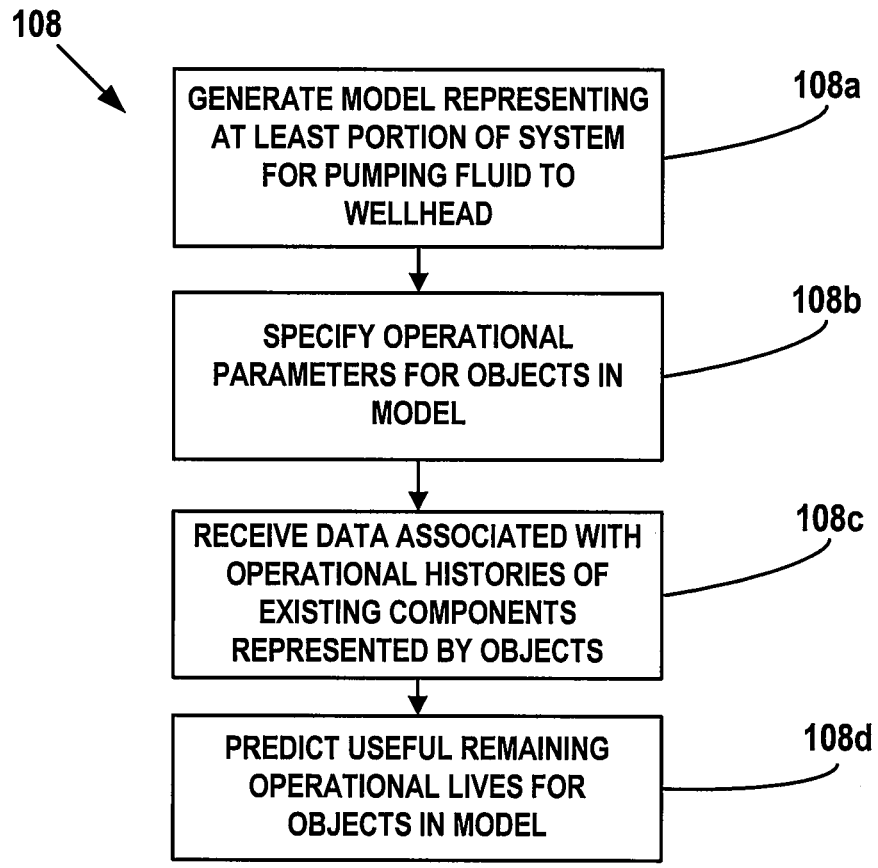
FIG. 8A is a flow chart illustration of a method of evaluating a system similar to that of FIGS. 1A and 1B, according to an exemplary embodiment.

In an exemplary embodiment, as illustrated in FIG. 8 with continuing reference to FIGS. 1A, 1B, 2, 3, 4, 5, 6 and 7, a method is generally referred to by the reference numeral 108. In an exemplary embodiment, the method 108 is implemented in whole or in part using the computer 88, one or more of the ID readers 96, 100 and 102, or any combination thereof.

The method 108 includes a step 108a, at which a model representing at least a portion of a system for pumping fluid to a wellhead is generated. In an exemplary embodiment, the model generated at the step 108a represents a system equivalent to the system 10 or at least a portion thereof, such as one or more of the pump systems 18, 20, 22 or 24. At step 108b, respective operational parameters are specified for objects in the model generated at the step 108a. At the step 108b, the objects represent existing components proposed to be a part of the system represented by the model generated at the step 108a, such as, for example, the pump systems 18, 20, 22 and 24, the components 26-48, etc. Before, during or after the steps 108a and 108b, data associated with the respective operational histories of the existing components represented by the objects is received at step 108c. The useful remaining operational lives for the objects in the model are predicted at step 108d.

Figure 8B:
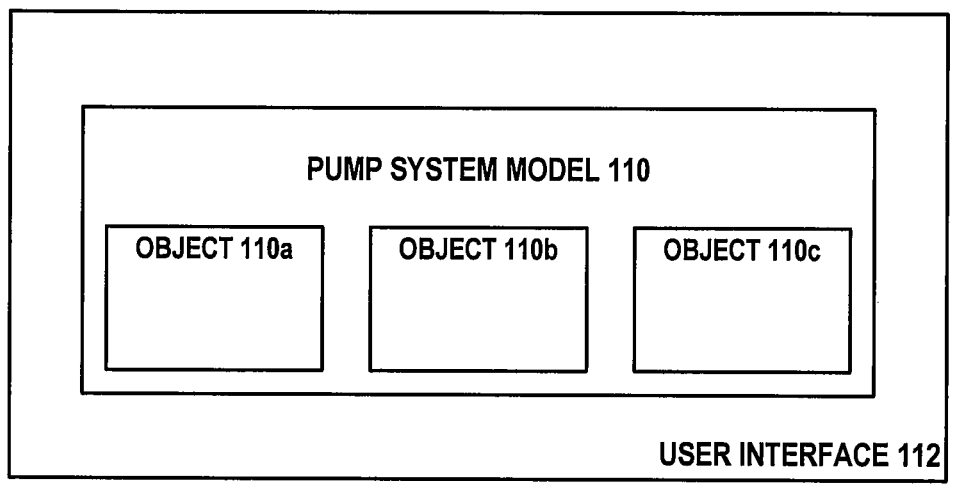
FIG. 8B is a diagrammatic illustration of a user interface generated during the execution of the method of FIG. 8A, according to an exemplary embodiment.

In an exemplary embodiment, as illustrated in FIG. 8B with continuing reference to FIGS. 1A, 1B, 2, 3, 4, 5, 6, 7 and 8A, a pump system model 110 is, or is part of, the model generated at the step 108a. A user interface 112 graphically displays the pump system model 110. The user interface 112 may be displayed on any type of output device or display, which may be part of, or operably coupled to, one or more of the computer 88, and the ID readers 96, 100 and 102. The pump system model 110 includes objects 110a, 110b and 110c, the operational parameters for which are specified at the step 108b. The objects 110a, 110b and 110c represent existing components proposed to be a part of the proposed pump system represented by the pump system model 110, and each of the existing components has a useful remaining operational life. For example, the objects 110a, 110b and 110c may represent the existing components 26, 28 and 30, respectively, with the components 26, 28 and 30 having respective useful remaining operational lives. As shown in FIG. 8B, each of the objects 110a, 110b and 110c has a proposed location within the pump system model 110.

In an exemplary embodiment, at the step 108b, operational parameters at the locations of the objects 110a, 110b and 110c are specified using, for example, the user interface 112. In several exemplary embodiments, the operational parameters specified at the step 108b may include a proposed fluid flow rate, a proposed fluid pressure, a proposed volume of media, a proposed volume of proppant, a proposed volume of sand, and a proposed time period during which fluid is to be pumped.

In an exemplary embodiment, the step 108c is substantially identical to the step 106d, except that at the step 108c operational history data for all of the respective components represented by the objects 110a, 110b and 110c are received, rather than for just one component. That is, the step 108c includes respective executions of the step 106d in connection with the objects 110a, 110b and 110c, and these executions may be carried out in whole or in part simultaneously and/or sequentially. In an exemplary embodiment, at the step 108c, the received data is associated with measurements of wear life attributes of the existing components represented by the objects 110a, 110b and 110c, or components equivalent thereto, which measurements are taken against time and under operational parameters(s) having the same, or different, values or ranges of values than that specified at the step 108b.

In an exemplary embodiment, the step 108d is substantially identical to the step 106e, except that at the step 108d the useful remaining operational lives for all of the objects 110a, 110b and 110c are predicted, rather than for just one object. That is, the step 108d includes respective executions of the step 106e in connection with the objects 110a, 110b and 110c, and these executions may be carried out in whole or in part simultaneously and/or sequentially. In an exemplary embodiment, at the step 108d, wear trends are determined for the existing components represented by the objects 110a, 110b and 110c, and the useful remaining operational lives of the objects 110a, 110b and 110c are predicted using the wear trends. The wear trends used at the step 108d are based on at least the operational parameters specified at the step 108b and the data received at the step 108c.

Figure 9A:
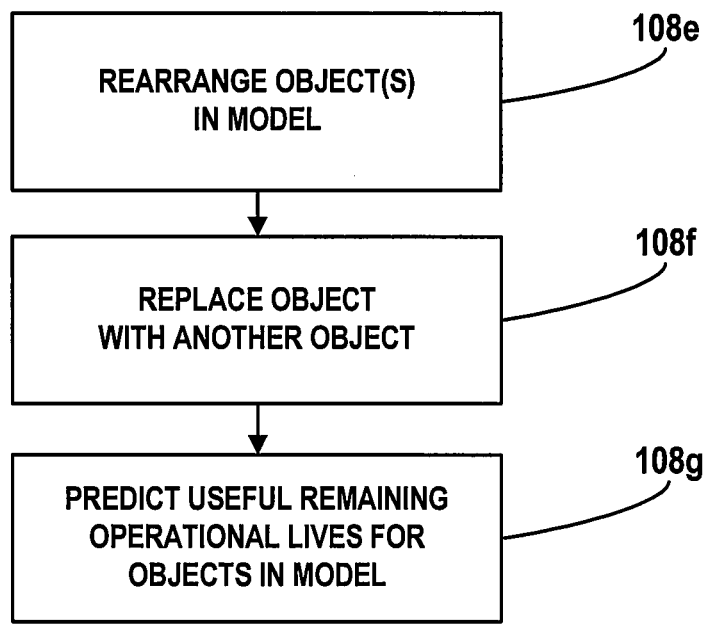
FIG. 9A is a flow chart illustration of additional steps of the method of FIG. 8A, according to an exemplary embodiment.
Figure 9B:
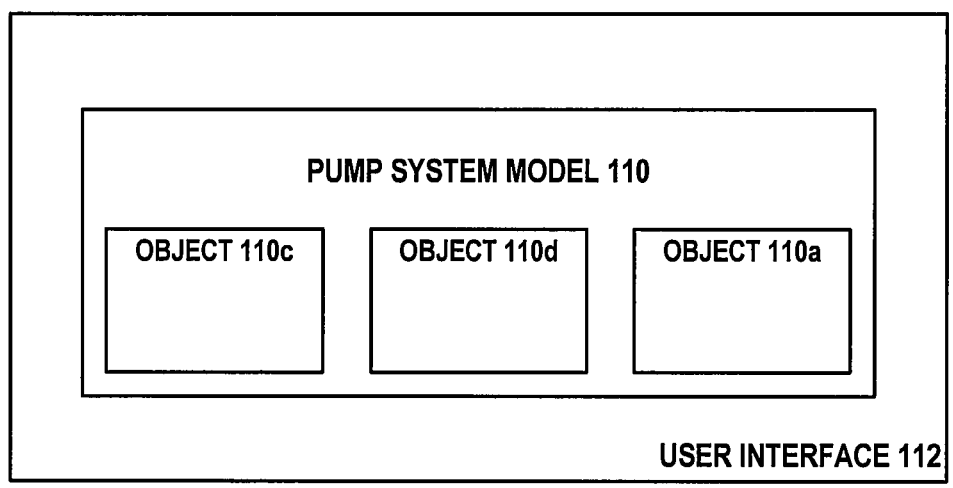
FIG. 9B is a diagrammatic illustration of a user interface generated during the execution of the steps of FIG. 9A, according to an exemplary embodiment.

In an exemplary embodiment, as illustrated in FIGS. 9A and 9B with continuing reference to FIGS. 1A, 1B, 2, 3, 4, 5, 6, 7, 8A and 8B, the method 108 further includes rearranging the objects 110a, 110b and 110c in the pump system model 110 at step 108e, replacing one of the objects 110a, 110b and 110c with another object at step 108f, and predicting the useful remaining operational lives for the objects in the model 110 at step 108g. As shown in FIG. 9B, the user interface 112 displays the rearranging of the objects 110a and 110c in accordance with the step 108e, and the replacing of the object 110b (not shown) with an object 110d, which represents an existing component other than the existing component represented by the object 110b. The step 108g is then executed, the step 108g being substantially identical to the step 108d except that the step 108g is executed in connection with the objects 110a, 110c and 110d, rather than in connection with the objects 110a, 110b and 110c. By repeating the steps 108e, 108f and 108g, different what-if scenarios may be evaluated quickly and efficiently, that is, different proposed systems for pumping fluid to the wellhead 16 may be evaluated quickly and efficiently.

Figure 10:
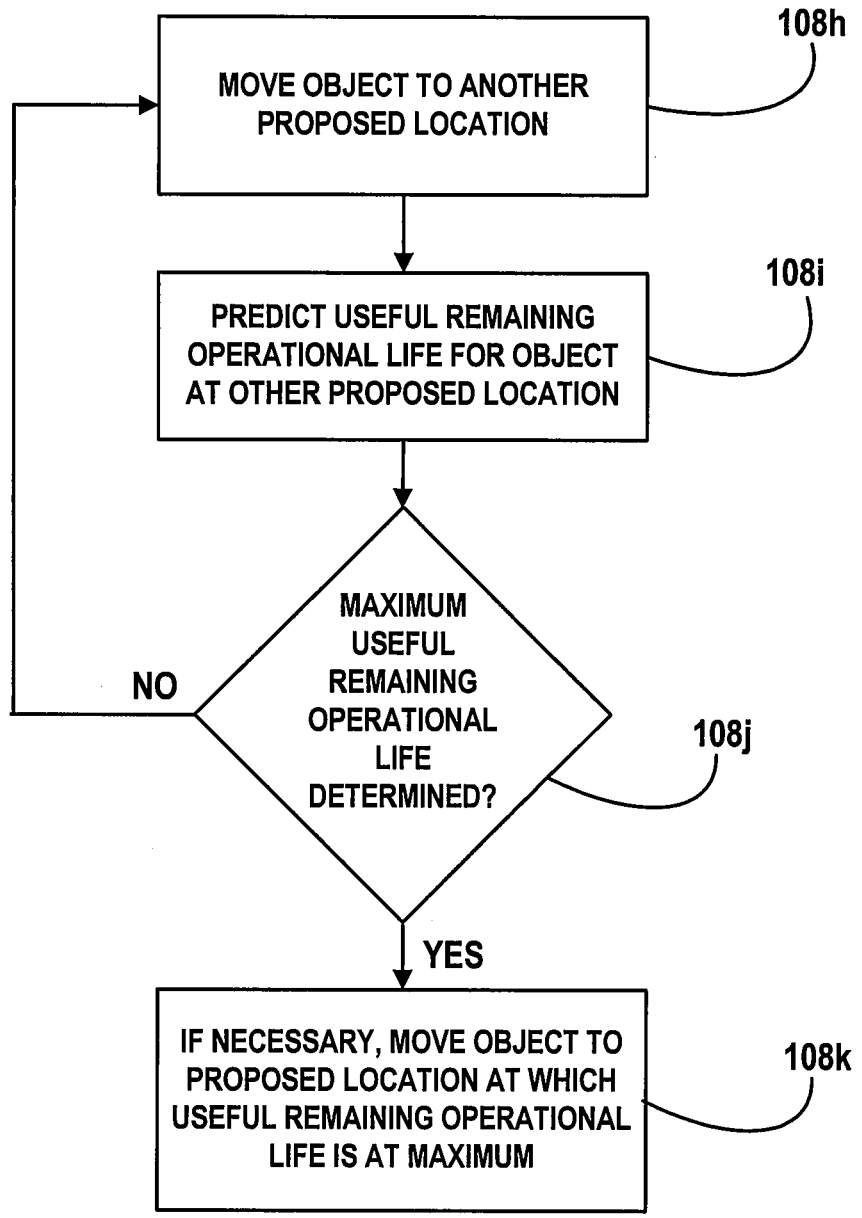
FIG. 10 is a flow chart illustration of additional steps of the method of FIG. 8A, according to an exemplary embodiment.

In an exemplary embodiment, as illustrated in FIG. 10 with continuing reference to FIGS. 1A, 1B, 2, 3, 4, 5, 6, 7, 8A, 8B, 9A and 9B, the method 108 may further include steps for optimizing the operational life of at least one of the objects in the pump system model 110 such as, for example, the object 110a. More particularly, the object 110a is moved to a proposed location at step 108h, and the useful remaining operational life of the object 110a at the proposed location is predicted at step 108i. The variance in the useful remaining operational life of the object 110a between different locations in the pump system model 110 is dependent upon the respective operational parameters at the locations. At step 108j it is determined whether the maximum useful remaining operational life for the object 110a has been determined. If not, then the steps 108h, 108i and 108j are repeated until it is determined at the step 108j that the maximum useful remaining operational life for the object 110a has been determined. At step 108k, if necessary, the object 110a is moved to the proposed location in the pump system model 110 at which the useful remaining operational life is at its maximum.

In an exemplary embodiment, the method 108 may be combined with the method 106, and the model generated at the step 108a may represent the system 10. In an exemplary embodiment, the method 106 may be carried out using the method 108 in whole or in part, with the model generated at the step 108a representing the system 10.

As a result of the method 108, safety is improved because the useful remaining operational lives of different components of the system represented by the pump system model 110 are predicted, and plans may be made to replace those components having relatively short useful remaining operational lives. As a result of the method 108, proposed components of the system represented by the model 110 nearing or past minimum specifications may be identified and removed from the model 110. Moreover, as a result of the method 108, downtime due to component failure during the operation of the system represented by the model 110 is reduced because the replacement of components having relatively short useful remaining operational lives can be planned before operating the system represented by the model 110, rather than having to replace such components midway during the operation of the system. Additionally, execution of the method 108 provides the ability to plan well service item requirements and replacement costs, improves operational performance, and reduces operating costs. Also, execution of the method 108 may assist well service companies and operators with spending plans by predicting the amount of well site-related jobs different components of the system represented by the model 110 will be able to complete. Execution of the method 108 may also assist well service companies and operators to plan well service-related jobs and select components for the job that will allow successful completion of the job without interruption.

Figure 11:
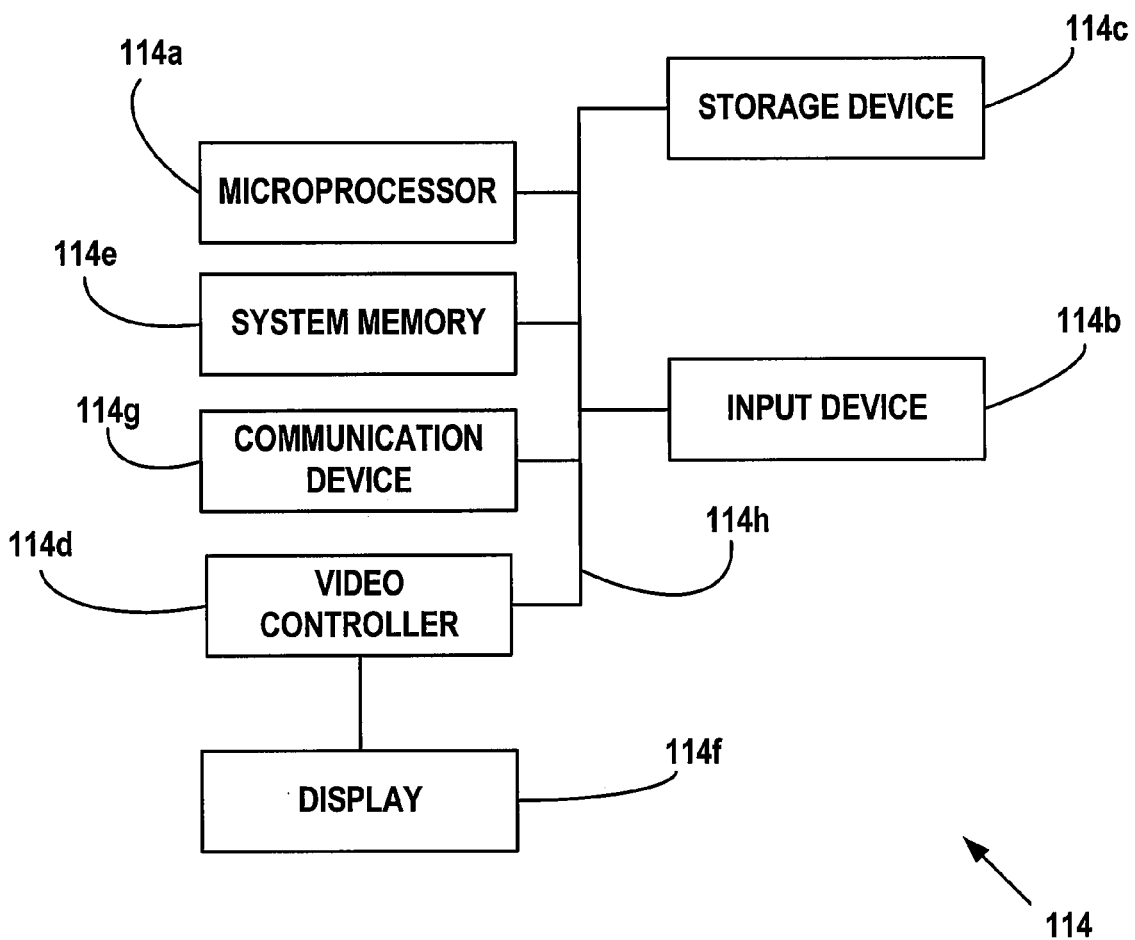
FIG. 11 is a diagrammatic illustration of a node for implementing one or more exemplary embodiments of the present disclosure, according to an exemplary embodiment.

In an exemplary embodiment, as illustrated in FIG. 11 with continuing reference to FIGS. 1A, 1B, 2, 3, 4, 5, 6, 7, 8A, 8B, 9A, 9B and 10, an illustrative node 114 for implementing one or more embodiments of one or more of the above-described networks, elements, methods and/or steps, and/or any combination thereof, is depicted. The node 114 includes a processor 114a, an input device 114b, a storage device 114c, a video controller 114d, a system memory 114e, a display 114f, and a communication device 114g, all of which are interconnected by one or more buses 114h. In several exemplary embodiments, the storage device 114c may include a floppy drive, hard drive, CD-ROM, optical drive, any other form of storage device and/or any combination thereof. In several exemplary embodiments, the storage device 114c may include, and/or be capable of receiving, a floppy disk, CD-ROM, DVD-ROM, or any other form of computer readable medium that may contain executable instructions. In several exemplary embodiments, the communication device 114g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the computer 88 and the ID readers 96, 100 and 102, and/or one or more components thereof, are, or at least include, the node 114 and/or components thereof, and/or one or more nodes that are substantially similar to the node 114 and/or components thereof. In several exemplary embodiments, one or more of the above-described components of one or more of the node 114, the computer 88 and the ID readers 96, 100 and 102, and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 98, and/or one or more portions thereof, may be designed to work on any specific architecture. In an exemplary embodiment, one or more portions of the network 98 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a computer program, such as a plurality of instructions stored on a computer readable medium, such as the computer readable medium 92, the database 94, the system memory 114e, and/or any combination thereof, may be executed by a processor to cause the processor to carry out or implement in whole or in part the operation of the system 10, one or more of the methods 106 and 108, and/or any combination thereof. In several exemplary embodiments, such a processor may include one or more of the processor 90, the processor 114a, and/or any combination thereof. In several exemplary embodiments, such a processor may execute the plurality of instructions in connection with a virtual computer system.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A method, comprising:
  receiving, using a computer, data identifying a first component in a first plurality of components,
    wherein the first plurality of components is part of a system associated with a wellhead,
    wherein the first component has a useful remaining operational life,
    wherein receiving the data identifying the first component comprises receiving data associated with a first reading of a first identifier that is coupled to the first component, and
    wherein the first reading is part of a first plurality of readings to be taken in a first predetermined order, each place in the first predetermined order corresponding to a respective location of one component in the first plurality of components;
  identifying, using the computer, a first location at which the first component is positioned relative to one or more other components in the first plurality of components,
    wherein identifying the first location at which the first component is positioned comprises determining the place in the first predetermined order at which the first reading was made;

receiving, using the computer, data associated with a first operational parameter specific to the first location;

receiving, using the computer, data associated with an operational history of the first component or one or more components equivalent thereto; and predicting, using the computer, the useful remaining operational life of the first component based on at least:
the first operational parameter, and
the operational history of the first component or one or more components equivalent thereto.

2. The method of claim 1, wherein the system associated with the wellhead is a system for pumping fluid to the wellhead.

3. The method of claim 1, wherein receiving data associated with the first reading of the first identifier further comprises:
positioning at least one reader in the vicinity of the first component;
reading the first identifier using the at least one reader to thereby obtain the first reading; and
transmitting the data associated with the first reading to the computer.

4. The method of claim 3, wherein the first identifier comprises an RFID tag; and
wherein the at least one reader is an RFID reader.

5. The method of claim 1, wherein the first operational parameter is selected from the group consisting of a fluid flow rate through the first component, a fluid pressure within the first component, a volume of media within the first component, a volume of proppant within the first component, a volume of sand within the first component, and a time period during which fluid is to be pumped through the first component.

6. The method of claim 1, wherein the first operational parameter specifies a value or range of values; and
wherein receiving data associated with the operational history comprises:
receiving data associated with measurements of one or more wear life attributes of the first component or one or more components equivalent thereto taken against time and under one or more operational parameters, the one or more operational parameters having the same, or different, values or ranges of values than that specified by the first operational parameter; and
storing the data associated with the wear life attribute measurements and the one or more operational parameters made thereunder; and
querying the stored data.

7. The method of claim 1, wherein predicting the useful remaining operational life of the first component comprises:
determining a wear trend for the first component based on at least the first operational parameter and the data associated with the operational history of the first component or one or more components equivalent thereto; and
predicting the useful remaining operational life of the first component using the wear trend.

8. The method of claim 1, further comprising:
(a) receiving, using the computer, data identifying another component in the first plurality of components, wherein the another component has a useful remaining operational life;
(b) identifying, using the computer, another location at which the another component is positioned relative to one or more other components in the first plurality of components;

(c) receiving, using the computer, data associated with another operational parameter specific to the another location;
(d) receiving, using the computer, data associated with an operational history of the another component or one or more components equivalent thereto;
(e) predicting, using the computer, the useful remaining operational life of the another component based on at least:
the another operational parameter, and
the operational history of the another component or one or more components equivalent thereto; and
(f) repeating (a)-(e) until the respective useful remaining operational lives of all the components in the first plurality of components have been predicted.

9. The method of claim 1, further comprising:
receiving, using the computer, data identifying a second component in a second plurality of components,
wherein the second plurality of components is part of the system associated with the wellhead, and
wherein the second component has a useful remaining operational life;
identifying, using the computer, a second location at which the second component is positioned relative to one or more other components in the second plurality of components;
receiving, using the computer, data associated with a second operational parameter specific to the second location;
receiving, using the computer, data associated with an operational history of the second component or one or more components equivalent thereto; and
predicting, using the computer, the useful remaining operational life of the second component based on at least:
the second operational parameter, and
the operational history of the second component or one or more components equivalent thereto.

10. An apparatus, comprising:
a non-transitory computer readable medium; and
a plurality of instructions stored on the non-transitory computer readable medium and executable by a processor, the plurality of instructions comprising:
instructions that cause the processor to receive data identifying a first component in a first plurality of components,
wherein the instructions that cause the processor to receive the data identifying the first component comprise instructions that cause the processor to receive data associated with a first reading of a first identifier that is coupled to the first component,
wherein the first reading is part of a first plurality of readings to be taken in a first predetermined order, each place in the first predetermined order corresponding to a respective location of one component in the first plurality of components,
wherein the first plurality of components is part of a system associated with a wellhead, and
wherein the first component has a useful remaining operational life;
instructions that cause the processor to identify a first location at which the first component is positioned relative to one or more other components in the first plurality of components,
wherein the instructions that cause the processor to identify the first location at which the first component is positioned comprises instructions that cause the processor to determine the place in the first predetermined order at which the first reading was made;

instructions that cause the processor to receive data associated with a first operational parameter specific to the first location;

instructions that cause the processor to receive data associated with an operational history of the first component or one or more components equivalent thereto; and instructions that cause the processor to predict the useful remaining operational life of the first component based on at least:

the first operational parameter, and the operational history of the first component or one or more components equivalent thereto.

11. The apparatus of claim 10, wherein the system associated with the wellhead is a system for pumping fluid to the wellhead.

12. The apparatus of claim 10, further comprising:

the first identifier, which is adapted to be coupled to the first component; and at least one reader adapted to read the first identifier and transmit the data identifying the first component.

13. The apparatus of claim 12, wherein the first identifier is an RFID tag; and wherein the at least one reader is an RFID reader.

14. The apparatus of claim 10, wherein the first operational parameter is selected from the group consisting of a fluid flow rate through the first component, a fluid pressure within the first component, a volume of media within the first component, a volume of proppant within the first component, a volume of sand within the first component, and a time period during which fluid is to be pumped through the first component.

15. The apparatus of claim 10, wherein the first operational parameter specifies a value or range of values; and wherein the operational history indicates a wear life of the first component or one or more components equivalent thereto as a function of time and the first operational parameter; and wherein instructions that cause the processor to receive data associated with the operational history comprises:

instructions that cause the processor to receive data associated with measurements of one or more wear life attributes of the first component or one or more components equivalent thereto taken against time and under one or more operational parameters, the one or more operational parameters having the same, or different, values or ranges of values than that specified by the first operational parameter; and instructions that cause processor to store the data associated with the wear life attribute measurements and the one or more operational parameters made thereunder; and instructions that cause the processor to query the stored data.

16. The apparatus of claim 10, wherein the instructions that cause the processor to predict the useful remaining operational life of the first component comprise:

instructions that cause the processor to determine a wear trend for the first component based on at least the first operational parameter and the data associated with the operational history of the first component or one or more components equivalent thereto; and instructions that cause the processor to predict the useful remaining operational life of the first component using the wear trend.

17. The apparatus of claim 10, wherein the plurality of instructions further comprises instructions that cause the processor to:

(a) receive data identifying another component in the first plurality of components, wherein the another component has a useful remaining operational life;

(b) identify another location at which the another component is positioned relative to one or more other components in the first plurality of components;

(c) receive data associated with another operational parameter specific to the another location;

(d) receive data associated with an operational history of the another component or one or more components equivalent thereto;

(e) predict the useful remaining operational life of the another component based on at least:

the another operational parameter, and the operational history of the another component or one or more components equivalent thereto; and (f) repeat (a)-(e) until the respective useful remaining operational lives of all the components in the first plurality of components have been predicted.

18. The apparatus of claim 10, wherein the plurality of instructions further comprises:

instructions that cause the processor to receive data identifying a second component in a second plurality of components, wherein the second plurality of components is part of the system associated with the wellhead, and wherein the second component has a useful remaining operational life;

instructions that cause the processor to identify a second location at which the second component is positioned relative to one or more other components in the second plurality of components;

instructions that cause the processor to receive data associated with a second operational parameter specific to the second location;

instructions that cause the processor to receive data associated with an operational history of the second component or one or more components equivalent thereto; and instructions that cause the processor to predict the useful remaining operational life of the second component based on at least:

the second operational parameter, and the operational history of the second component or one or more components equivalent thereto.

* * * * *